(12) United States Patent
Gupta et al.

(10) Patent No.: US 7,747,561 B1
(45) Date of Patent: Jun. 29, 2010

(54) SYNCHRONIZATION PROTOCOL FOR SYNCHRONIZING DATA BETWEEN NODES

(75) Inventors: Atul Gupta, San Jose, CA (US); William L. Mills, Battle Ground, WA (US); Gerard Pallipuram, Mountain View, CA (US)

(73) Assignee: PalmSource Inc., Sunnyvale, CA (US)

( * ) Notice: Subject to any disclaimer, the term of this patent is extended or adjusted under 35 U.S.C. 154(b) by 1218 days.

(21) Appl. No.: 10/159,918

(22) Filed: May 31, 2002

Related U.S. Application Data

(60) Provisional application No. 60/377,713, filed on May 2, 2002.

(51) Int. Cl.
  G06F 17/30 (2006.01)

(52) U.S. Cl. .......................................... 707/204; 707/3
(58) Field of Classification Search ................. 455/418; 370/465, 349; 707/204, 3
See application file for complete search history.

(56) References Cited

U.S. PATENT DOCUMENTS

| | | | | |
|---|---|---|---|---|
| 6,233,248 | B1* | 5/2001 | Sautter et al. | 370/465 |
| 6,311,058 | B1* | 10/2001 | Wecker et al. | 455/418 |
| 6,389,423 | B1* | 5/2002 | Sakakura | 707/10 |
| 6,539,381 | B1* | 3/2003 | Prasad et al. | 707/10 |
| 2002/0156915 | A1* | 10/2002 | Haggar et al. | 709/238 |
| 2004/0013105 | A1* | 1/2004 | Ahmavaara et al. | 370/349 |

OTHER PUBLICATIONS

RFC 2960 (RFC 2960, http://www.zvon.org/tmRFC/RFC2960/Output/Chapter12.html), Oct. 2000).*
TCP/IP Protocol (RFC 2960, http://en.wikipedia.org/wiki/Transmission_Control_Protocol, and http://en.wikipedia.org/wiki/Internet_protocol_suite, 1982).*
T. Socolofsky et al., "A TCP/IP Tutorial", Jan. 1991, [online] [retrieved on Feb. 20, 2007]. Retrieved from the Internet <URL: http://www.rfc-editor.org/cgi-bin/rfcsearch.pl, ftp://ftp.rfc-editor.org/in-notes/rfc1180.txt>.*
Saleh et a., "Synthesis of communications protocols: an annotated bibliography", ACM SIGCOMM Computer Communication Review, vol. 26, Issue 5, Oct. 1996, p. 40-59. Retrieved from the Internet:URL: http://portal.acm.org/ft_gateway.cfm?id=242900&type=pdf&coll=GUIDE&dl=GUIDE&CFID=63249584&CFTOKEN=70517377.*
Postel et al., "Internet Official Protocol Standards", Internet Architecture Board, RFC-2000, p. 1-56, Feb. 1997. Retrieved from the Internet:<URL: http://www.faqs.org/ftp/rfc/pdf/rfc2000.txt.pdf.*

* cited by examiner

*Primary Examiner*—John E Breene
*Assistant Examiner*—Dennis Myint
(74) *Attorney, Agent, or Firm*—Berry & Associates P.C.

(57) ABSTRACT

A method and system thereof for synchronizing a data set comprising a first data set residing on a first node with a second data set residing on a second node. Packets are exchanged with the second node. A packet comprises one or more messages and a message comprises a plurality of elements. At least one of the elements identifies the data set. Other information in the packets is used to identify any data from the first data set that needs to be sent to the second node and any data from the second data set that needs to be received from the second node, in order to synchronize the data set on both nodes. The data so identified can then be exchanged.

36 Claims, 7 Drawing Sheets

310

320

SYNCHRONIZATION PROTOCOL FOR SYNCHRONIZING DATA BETWEEN NODES

RELATED U.S. APPLICATION

This application claims priority to the copending provisional patent application Ser. No. 60/377,713, entitled "System and Method for Synchronizing Computer Databases," with filing date May 2, 2002, and assigned to the assignee of the present application.

BACKGROUND OF THE INVENTION

1. Field of the Invention

The present invention relates generally to the field of databases. Specifically, the present invention relates to a method and system for synchronizing data between multiple nodes.

2. Related Art

In the realm of hand-held computer systems (commonly referred to as personal digital assistants or PDAS), it is not uncommon for a data set to exist and be maintained both on the PDA and on at least one other device. For example, a user may maintain a calendar or address book on both his or her PDA and on another computer system (e.g., a personal computer system such as a desktop or laptop).

The entries in the data set can be referred to as records or data objects. When a change is made to a record in the data set residing on one device (hereinafter, also referred to as a node), it is desirable to have the data set on the other node be updated as well, so that the data set is synchronized on both nodes. Accordingly, processes have been developed to facilitate synchronizing the data sets on both nodes. These synchronization ("sync") processes are known in the art.

Currently, each record in a data set is identified by a unique record identifier (record ID). To prevent duplication of record IDs, the task of assigning IDs to records is relegated to the PDA.

Generally, synchronization is performed using either a "slow sync" technique or a "fast sync" technique. Using a slow sync, all of the records are transferred between nodes; the data set on one node is transferred to the other. The records in each data set are then compared in order to determine which records have changed since the last sync, and the respective data sets are updated accordingly.

Fast syncs are accommodated by tagging records when they are modified. Typically, a bit associated with each record is set to one value or another to indicate whether or not that record has been changed since the last sync; the bits that have been set are often referred to as "dirty" bits. Using a fast sync, only the changes made to the data set on each node since the last sync are transferred to the other node. After the fast sync is performed, the dirty bits are cleared.

Although fast syncs are preferred, there are occasions when slow syncs need to be performed. For instance, it is becoming more common for people to use more than one computer system. Many people use a computer system at home and another one at work, for example. If a user performs a fast sync between the PDA and one of the computer systems, the dirty bits would be cleared. Consequently, the records on the PDA that have changed cannot be identified using the dirty bits. Therefore, a subsequent sync between the PDA and another computer system will use a slow sync to identify changes made to the records since the last time these latter two nodes were synched.

Thus, one problem with the prior art is that slow syncs are occurring more frequently as a growing number of people interact with multiple computer systems. Slow syncs take longer to complete than fast syncs, and so they are less desirable. Also, the time needed to complete slow syncs is increasing as memory sizes increase.

Another issue with prior art synchronization techniques is that they are limited with respect to the different types of syncs that can now occur. Traditionally, synchronization occurs between a PDA and one or more personal computer systems as described above. However, the paradigm in which the PDA serves in essence as the nexus between the user's home and office computer systems is not as applicable as it once was. As computer systems are networked, multiple communication pathways between PDAs and computer systems can exist, and synchronization between multiple devices needs to be supported. The notion of a single source (e.g., the PDA) for record IDs is not as workable as before.

Also, records are frequently shared between users and quite often are distributed and stored across many nodes. Some records may be accessible by multiple users working from different nodes. In any event, different users may update a record in different ways, and the modified record may be distributed over different pathways. Along the way, the record may be further modified. As a result, different versions of the same record may reach a node, causing a conflict to arise as to which version of the record should take precedence over another. Using contemporary synchronization techniques, these records are unnecessarily replicated at the destination node, slowing down syncs while consuming memory. User intervention is then required to glean which records are correct and which can be discarded.

Another problem with contemporary synchronization techniques is that, during even a fast sync, each record update occurs using a separate packet exchange. That is, the sync is performed using a relatively large number of relatively small packets. Because there is a degree of latency associated with each packet exchange, reliance on a large number of packets increases the overall latency of the sync operation. Also, reliance on smaller packets does not effectively utilize the higher bandwidth provided by connections such as Universal Serial Buses (USBs) and wireless communication technologies.

Therefore, improvements to prior art synchronization techniques are desirable. Accordingly, what is needed is a system and/or method that can provide these improvements. The present invention provides these improvements and others not specifically mentioned above.

SUMMARY OF THE INVENTION

Embodiments of the present invention pertain to a synchronization protocol for communicating between nodes (e.g., between a desktop computer system and a hand-held computer system). More specifically, embodiments of the present invention provide a method and system thereof for synchronizing a data set comprising a first data set residing on a first node with a second data set residing on a second node. The synchronization protocol of the present invention can be used peer-to-peer.

In its various embodiments, the synchronization protocol of the present invention provides the properties of extensibility, compactness (compressibility), modularity and streamability. The synchronization protocol provides a framework for robustly and efficiently synchronizing data between arbitrary nodes.

In the present embodiment, one node (e.g., the first node) exchanges packets with another node (e.g., the second node). A packet comprises one or more messages and a message comprises a plurality of elements. At least one of the elements identifies the data set. In one embodiment, the packet also includes a session identifier. In another embodiment, the packet also includes version information identifying a version of a synchronization protocol used by the first node. Other information in the packets is used to identify any data from the first data set that needs to be sent to the second node and any data from the second data set that needs to be received from the second node, in order to synchronize the data set on both nodes. The data so identified can then be exchanged.

According to the present embodiment, a packet includes an element identifying the beginning of the packet and an element identifying the end of the packet, with one or more messages residing between these elements. Similarly, in the present embodiment, a message includes an element identifying the beginning of the message and an element identifying the end of the message, with other elements residing between these elements.

In one embodiment, data are streamed to the second node in blocks of data that are sized according to the size of an outbound buffer. Data can be streamed as the data become available. On the receiving end, data are read and processed until an end-of-packet element is received. Note that streaming can occur from either node to the other. That is, although in the present embodiment data are described as being streamed to the second node, streaming can occur in both directions.

In another embodiment, the data are compressed before being sent to the second node. Note that data received from the second node may also be compressed. That is, although in the present embodiment data are described as being compressed before being sent to the second node, compressed data can be sent in either direction.

In one embodiment, a second packet can be sent subsequent to sending a first packet before a response to the first packet is received. That is, because packets can include more than one message, messages (e.g., commands) can be batched in a single packet, and as such the number of transactions can be reduced. Also, a first message can be sent in a first packet and, while waiting for a response to the first message, a second message can be sent in another packet. In general, it is not necessary to wait for a response to a first message before sending a second message, which can contribute to faster syncs.

Embodiments of the present invention synchronization protocol define how data are moved within a node. The synchronization protocol supports fast syncs and partial syncs; it is stateless so that it can support being interrupted. The synchronization protocol also supports optimized wireless refreshes and group synchronization. Group synchronization introduces concepts such as global record identifiers, pedigree, and coverage, and the synchronization protocol provides the functionality to represent and communicate these concepts.

In addition, the synchronization protocol allows new sync elements and messages to be defined, and for information to be added to elements already defined. Messages and elements not recognized can be ignored, so that different versions of the synchronization protocol can be used between nodes, and compatibility with legacy synchronization protocols is possible. As such, the synchronization protocol is extensible. New elements can be defined and added to a message without impacting the existing implementation. New messages can be defined and added to a synchronization packet without impacting the existing implementation.

These and other objects and advantages of the present invention will become obvious to those of ordinary skill in the art after having read the following detailed description of the preferred embodiments, which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "exchanging" or "forwarding" or "streaming" or "compressing" or "identifying" or "sending" or "receiving" or the like, refer to the action and processes of a computer system (e.g., flowchart 400 of FIG. 4), or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Implementation Platforms

Figure 1A:
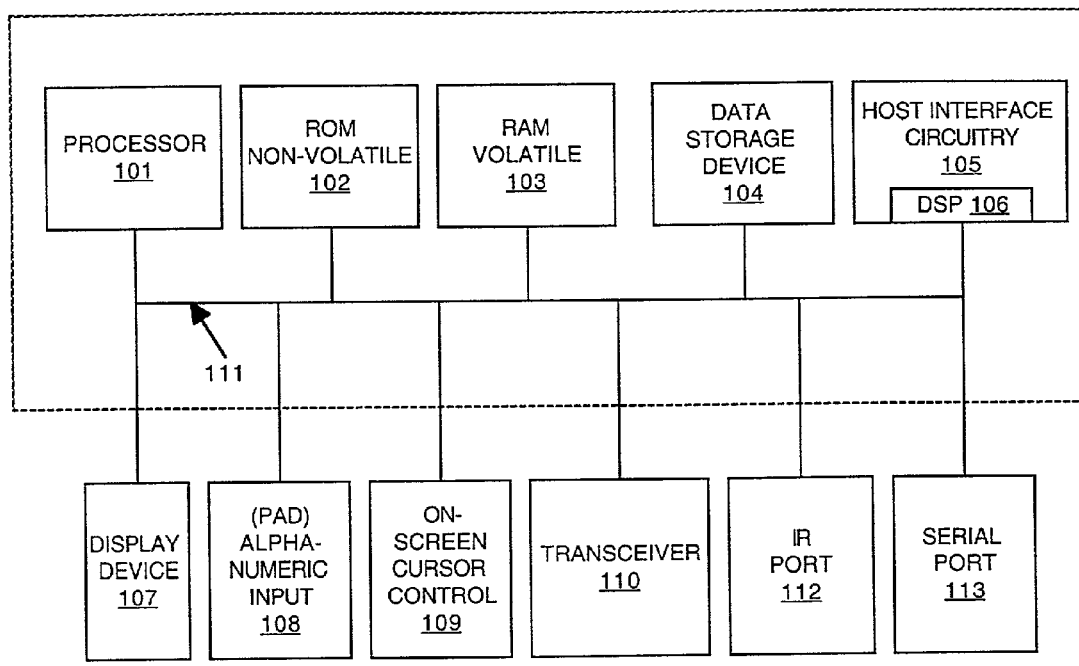
FIG. 1A is a block diagram of an exemplary hand-held computer system upon which embodiments of the present invention may be practiced.

FIG. 1A is a block diagram of one embodiment of a device 100 upon which embodiments of the present invention may be implemented. In one embodiment, device 100 is a hand-held computer system often referred to as a personal digital assistant (PDA) or a portable information device (PID). In its various implementations, device 100 may not include all of the elements illustrated by FIG. 1A, or device 100 may include other elements not described by FIG. 1A.

In one embodiment, device 100 includes an address/data bus 111 for communicating information, a central processor 101 coupled with the bus 111 for processing information and instructions, a volatile memory 103 (e.g., random access memory, RAM) coupled with the bus 111 for storing information and instructions for the central processor 101, and a non-volatile memory 102 (e.g., read only memory, ROM) coupled with the bus 111 for storing static information and instructions for the processor 101. In the present embodiment, device 100 also includes an optional data storage device 104 (e.g., a Secure Digital card, a Multi Media Card, or the like) coupled with the bus 111 for storing information and instructions. Device 104 can be removable. In one embodiment, device 100 also contains a display device 107 coupled to the bus 111 for displaying information to a user.

In the present embodiment, device 100 also includes a signal transmitter/receiver (transceiver) device 110, which is coupled to bus 111 for providing a wireless radio (RF) communication link between device 100 and other wireless devices. Transceiver 110 may be coupled to device 100 or integral with device 100.

In one embodiment, device 100 includes host interface circuitry 105 coupled to bus 111. Host interface circuitry 105 includes an optional digital signal processor (DSP) 106 for processing data to be transmitted or data that are received via transceiver 110. Alternatively, processor 101 can perform some or all of the functions performed by DSP 106. In one embodiment, host interface circuitry 105 comprises a universal asynchronous receiver-transmitter (UART) module that provides the receiving and transmitting circuits utilized for serial communication for both the infrared port 112 and the serial port 113.

In one embodiment, device 100 also includes an optional alphanumeric input device 108 that, in one implementation, is a handwriting recognition pad ("digitizer"). Alphanumeric input device 108 can communicate information and command selections to processor 101 via bus 111. In one embodiment, device 100 also includes an optional cursor control or directing device (on-screen cursor control 109) coupled to bus 111 for communicating user input information and command selections to processor 101. In one implementation, on-screen cursor control device 109 is a touch screen device incorporated with display device 107.

Figure 1B:
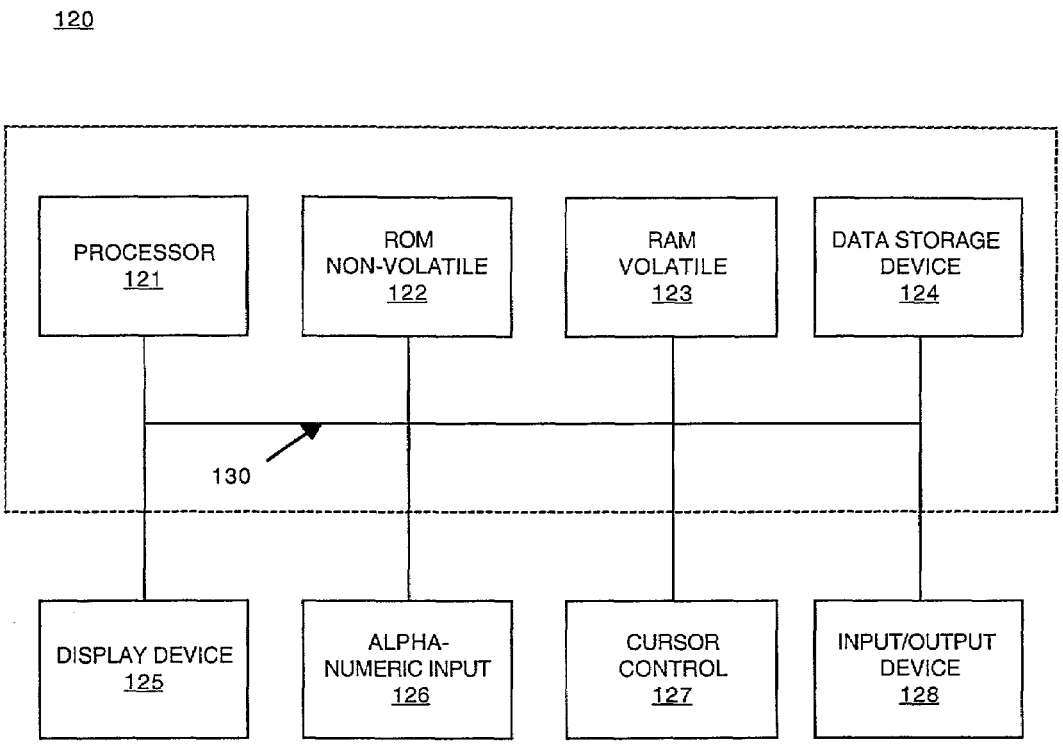
FIG. 1B is a block diagram of an exemplary desktop computer system upon which embodiments of the present invention may be practiced.

Refer now to FIG. 1B that illustrates an exemplary computer system 120 upon which embodiments of the present invention may be practiced. In its various implementations, device 120 may not include all of the elements illustrated by FIG. 1B, or device 120 may include other elements not described by FIG. 1B.

In general, computer system 120 comprises bus 130 for communicating information, processor 121 coupled with bus 130 for processing information and instructions, RAM 123 coupled with bus 130 for storing information and instructions for processor 121, ROM 122 coupled with bus 130 for storing static information and instructions for processor 121, data storage device 124 such as a magnetic or optical disk and disk drive coupled with bus 130 for storing information and instructions, an optional user output device such as display device 125 coupled to bus 130 for displaying information to the computer user, an optional user input device such as alphanumeric input device 126 including alphanumeric and function keys coupled to bus 130 for communicating information and command selections to processor 121, and an optional user input device such as cursor control device 127 coupled to bus 130 for communicating user input information and command selections to processor 121. Furthermore, input/output (I/O) device 128 is used to communicatively couple computer system 120 to another device (e.g., device 100 of FIG. 1A). I/O device 128 may be a device used for wired communication or for wireless communication.

Exemplary Synchronization Architecture

In its various embodiments, the synchronization protocol of the present invention specifies a framework for synchronizing data between nodes (e.g., a device 100 and computer system 120) based on a request/response structure. The protocol can be used for peer-to-peer data synchronization between arbitrary sync nodes as well; this does not preclude use with nodes having a master/slave relationship. A node may be intermittently connected to other nodes it synchronizes with.

Figure 2:
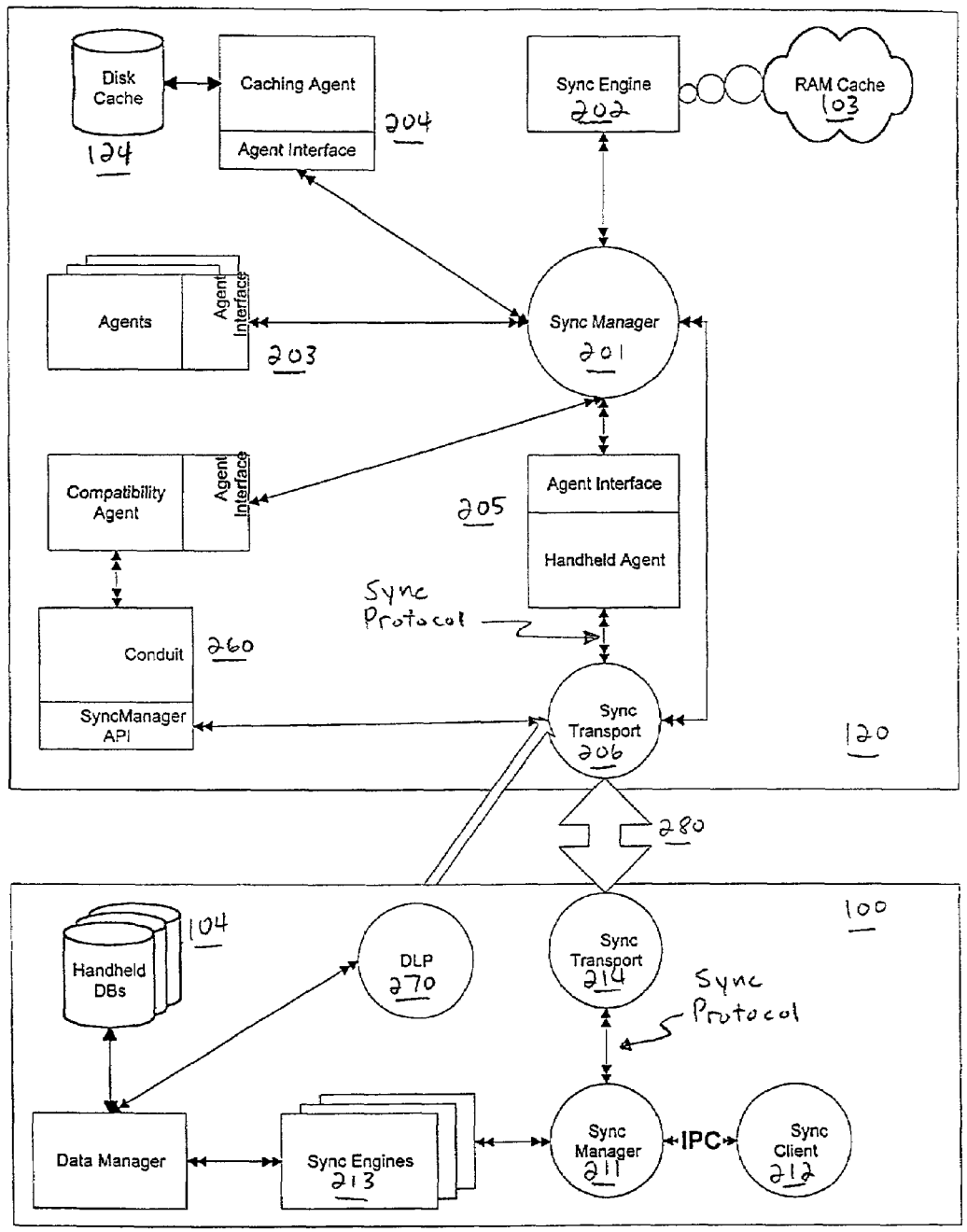
FIG. 2 is a block diagram showing the various elements of a synchronization architecture according to one embodiment of the present invention.

FIG. 2 is a block diagram showing the various elements of a synchronization architecture according to one embodiment of the present invention. Device 100 communicates with computer system 120, and vice versa, via open channel 280, which may be a wireless or a wired connection. Although described in the context of a device 100 (e.g., a PDA or hand-held computer system) in communication with a computer system 120 (e.g., a desktop computer system), it is appreciated that the synchronization architecture of FIG. 2 can also be used for peer-to-peer synchronization (e.g., PDA to PDA, or desktop to desktop).

In the present embodiment, with regard to computer system 120, sync manager 201 works closely with sync engine 202 and the agents 203, 204 and 205. In this embodiment, sync manager 201 acts primarily as a scheduler and coordinator. It delegates data management to the agents 203, 204 and 205, and synchronization to sync engine 202.

According to an embodiment of the present invention, each agent 203, 204 and 205 communicates with a single endpoint. The term "endpoint" (or "farpoint") is used herein to refer to a source or destination of records (data objects) that are to be synchronized. For example, it is commonplace to synchronize a desktop calendar system database with a calendar database on a hand-held computer. In this example, the calendar database on the desktop computer is an endpoint, and the hand-held calendar database is another endpoint. Endpoints are generally data structures in permanent, or semi-permanent, computer memory. However, endpoints may be temporary, for example, a buffer in a wireless data protocol stack.

The sync manager 201 provides an application program interface (API) that allows any agent or application to start a full or partial sync session. These sessions can be tailored to a particular purpose and do not necessarily require the participation of another node (e.g., device 100). Sync manager 201 starts a sync session when it receives a start session request from another node (e.g., device 100).

In the present embodiment, the synchronization architecture of FIG. 2 also includes a conventional conduit and sync manager API 260, providing the functionality to synchronize with legacy devices.

With regard to device 100 (e.g., a hand-held computer system), the sync manager 211 works closely with sync client 212 and sync engines 213. The sync manager 211 is a system-level processor that acts primarily as a protocol adapter for the sync engines 213. Sync manager 211 provides an API that allows any hand-held application to start a partial or full sync session with a specified target node; sync client 212 is one such application. Sync client 212 is a user-level process that provides configuration options and a session interface offering a cancel option. Desktop link server (DLP) 270 provides the functionality to synchronize legacy applications and databases and allows synchronization with legacy devices.

According to the present embodiment, the synchronization protocol of the present invention is implemented between sync manager 211 and sync transport 214 on device 100, and between agent 205 and sync transport 206 on computer system 120.

Exemplary Packet and Message Representations

In its various embodiments, the synchronization protocol of the present invention defines the representation for a set of well-defined messages that are conveyed between two nodes that are participating in a data synchronization task. The protocol representation defines the packet structure for request and response commands in the various sync phases. It also defines the complete set of messages that constitute a sync request/response packet in a synchronization phase. It also provides details on the representation of elements that constitute these messages.

Figure 3A:
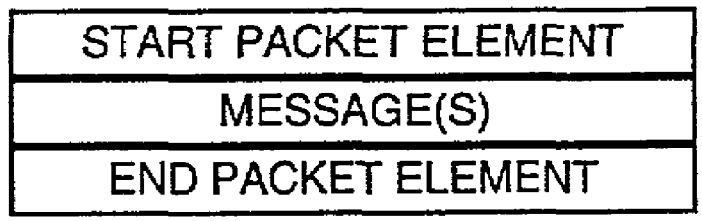
FIG. 3A is a representation of a synchronization packet according to one embodiment of the present invention.

FIG. 3A is a representation of a synchronization packet 310 according to one embodiment of the present invention. Sync packet 310 includes one or more sync messages. Sync packet 310 also includes a Start Packet element and an End Packet element.

The Start Packet element identifies the beginning of sync packet 310. It is outside of any message, has no element data, and has a length that is set to zero. The End Packet element identifies the end of sync packet 310 and will occur sometime after the start packet element. The End Packet element is outside of any sync message, does not have any element data, and has a length that is set to zero.

For each Start Packet element, there is a corresponding End Packet element. The elements and messages between the first occurrence of a Start Packet element and the corresponding End Packet element are parsed, and any element outside these two elements is ignored.

Figure 3B:
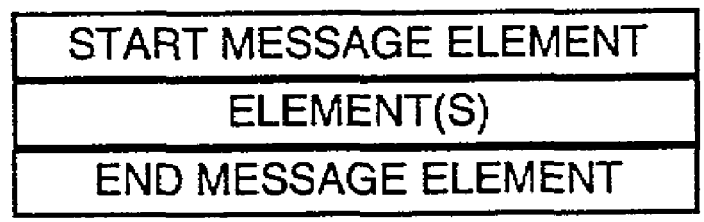
FIG. 3B is a representation of a synchronization message according to one embodiment of the present invention.

FIG. 3B is a representation of a synchronization message 320 according to one embodiment of the present invention. Each message consists of zero or more composite elements. A composite element includes one or more basic elements. Composite and basic elements are further described below.

In the present embodiment, the different types of messages include: Request Query, Query Response, Request Update, Update Response, Update Report, Update Acknowledge, Cancel Session, and Cancel Database Sync. These messages are described further below. It is appreciated that the list of messages utilized with the synchronization protocol of the present invention may be expanded (or shortened).

In one embodiment, a sync message 320 will contain some form of session information. In another embodiment, sync message 320 will identify the database being synched (except when canceling the complete sync session) and the protocol implementation version at the node from which the message is sent.

According to the present invention, in a single session, multiple databases for a particular user may be synched. For example, sync packet 310 (FIG. 3A) may include two messages 320 (FIG. 3B), one message for synching an address book, and the other for synching the date book (calendar) for the same user.

Also according to the present invention, multiple messages 320 with different context (users) can be packaged in the same sync packet 310. For example, a sync packet 310 may include two messages 320 for synching the address book for two different users.

Furthermore, according to the present invention, a sync packet 310 may include different types of messages 320, for example, a Request Query message for an address book and a Request Update message for a date book. The protocol is easily extensible to sync multiple databases for multiple users in the same sync packet. This facilitates a multiple context synchronization solution to keep the two nodes (all the databases for multiple users, some form of data replication) in sync by using the same sync packet for communication.

Exemplary Basic Elements

A basic element is a component of a composite synchronization element. Table 1 is a list of basic elements and their representation according to one embodiment of the present invention. It is appreciated that other basic element types can be defined and added to the list.

TABLE 1

Exemplary Basic Synchronization Element

| Basic Element Name | Basic Element Data Type |
|---|---|
| Creator ID | 4 byte unsigned integral value |
| Type ID | 4 byte unsigned integral value |
| Database Name | STRING |
| Record/Object GUID | 16 bytes |
| Category GUID | 16 bytes |
| Data Source ID | 12 bytes |
| Clock Value | 4 byte unsigned integral value |
| User GUID | 16 bytes |

GUID refers to a global and unique identifier assigned to records/objects, categories and users. According to the present embodiment of the present invention, an identification scheme is implemented at each node to assign GUIDs. Thus, in the present embodiment, the assignment of identifiers is not relegated to the hand-held device. The identification scheme ensures that each unique records/object, category and user is not given the same identifier by different nodes.

In the present embodiment, integral values are communicated in network byte order format. The record/object GUID, category GUID, data source ID, user GUID are fixed-length sequence of bytes and are not integral values in this embodiment of the synchronization protocol. The synchronization protocol also introduces a data type 'STRING'. The elements of type 'STRING' are represented as:

| Field Length | 4 byte unsigned integral value |
|---|---|
| Field Value | N UTF8 bytes (coded representation for all the characters of the UCS - Universal Character Set) (UTF8 refers to the Unicode Transformation Format-8 standard) |

Exemplary Composite Elements

A composite element includes one or more basic elements. A composite element may or may not have an explicit element type. A composite element is a message constituent.

The representations for composite elements without an explicit element type are listed below. These elements include a Sync Clock element and a Pedigree and Coverage element. Such elements include of one or more of the basic elements described above.

In the present embodiment, a Sync Clock element is represented as a Data Source ID and Clock value pair:

| | |
|---|---|
| Data Source ID | 12 bytes |
| Clock Value | 4 byte unsigned integral value |

Pedigree and Coverage are identical in representation but different in semantics. A "pedigree" is generally a change history of a database object, and may be used to indicate if an object has changed since a prior synchronization session. "Coverage" (or cover) is generally a set of sync clocks associated with the data set. The cover means that the set of data records/objects retained by the node includes, or has priority over, all data records/objects with changes occurring on or before the status clocks. For example if the clocks are A:7, B:17, C:13 (meanings sync clocks A, B, and C are at 7, 17, and 13, respectively), then the data set includes all changes from source A that occurred at 7 or earlier, all from source B that occurred at 17 or earlier and all from source C that occurred at 13 or earlier. A recipient node can therefore inform a sending node of its coverage status. This allows the sending node to filter out data records/objects already seen by the recipient, resulting in a fast sync. The sending node can also send its own coverage status. The recipient can then update its own coverage status to include the sender's coverage status. For example, if the recipient has coverage status A:7,B:17,C:13 and the sender has coverage status A:4,B:19,D:82 then the sender should send any changes with timestamps greater than B:17 or D:0. These are the changes the recipient has not seen. On receiving this information, the recipient node can then update its coverage status to A:7,B:19,C:13,and D:82.

In the present embodiment, pedigree and coverage are represented as a variable-length unordered vector of Sync Clocks:

| | |
|---|---|
| # Sync Clocks | 4 byte unsigned integral value |
| Sync Clock – 1 | 16 bytes |
| ... | |
| ... | |
| Sync Clock – N | 16 bytes |

A NULL Pedigree is represented as:

| | |
|---|---|
| #Sync Clocks | 4 byte unsigned integral value (0-zero) |

In the present embodiment, each composite element provides the element type and length of the element content in its header. The element content is well defined for that element type and a version of the synchronization protocol. In the present embodiment, the general representation of a composite element with an explicit element type is as follows:

| | |
|---|---|
| Element Type | WORD |
| Element Length | 4 byte unsigned integral value |
| Element Data | N bytes |

In this embodiment, the Element Length enables a conventional (legacy) parser to skip any extended content in an element's data. It also allows skipping of any new elements in a message that were defined after its implementation. It also facilitates skipping of unknown messages by skipping its constituent elements.

In the present embodiment, an Element Type is a tag to identify an element in a sync message. The values for various composite elements type are defined in Table 2 for one embodiment of the present invention.

TABLE 2

Exemplary Composite Elements Types

| Element Type | Description |
|---|---|
| 0x0001 | Start Packet Element |
| 0x0002 | End Packet Element |
| 0x0003 | Start Message Element |
| 0x0004 | End Message Element |
| 0x0005 | User Context Element |
| 0x0006 | Session ID Element |
| 0x0007 | Database Identifier Element |
| 0x0008 | Sync Protocol Version Element |
| 0x0009 | Cancel Element |
| 0x000A | Query/Expertise Element |
| 0x000B | Update Element |
| 0x000C | End Element |

The synchronization protocol of the present invention allows the definition of new elements and the extension of existing elements, via the length field in each element. Conventional or legacy implementations can ignore the extra data they do not understand. An implementation can use the sync protocol version element to expect the presence/absence of extra data.

The Start Packet and End Packet elements have been described above.

A Start Message element marks the beginning of a sync message 320 within a sync packet 310 (FIGS. 3A and 3B). There can be multiple sync messages in a sync packet. In the present embodiment, each Start Message element will have a corresponding End Message element. In one embodiment, a Start Message element is represented as below:

Message Type WORD

The various message type values are described further below.

An End Message element marks the end of a sync message 320 within a sync packet 310. It does not have any element data associated and its length is always set to zero.

A User Context element uniquely identifies the user whose database is being synched. In one embodiment, a User Context element is represented as:

| | |
|---|---|
| User GUID | 16 bytes |
| User Name Length | 4 byte unsigned integral value |
| User Name Value | N UTF-8 bytes |

The User Context element identifies the user's sync session. In the present embodiment, each message 320 will incorporate this element for a stateless synchronization protocol. The User Context element in a sync message 320 associates that message with the user.

In the present embodiment, to support simultaneous synchronization of multiple devices with a server node, with each device having the same user context, session information is communicated once along with an associated session ID that is then used in subsequent sync packets. The session ID is encapsulated in a Session ID element that can be represented as:

Session ID 4 byte unsigned integral value

In the present embodiment, each message incorporates session information. The session information includes either a Session ID Element or a User Context element, or both. The session information is communicated in each message of the sync packet. The session ID abbreviates user context information.

In the present embodiment, the Database Identifier element uniquely identifies the database being synched. It can be represented as:

| | |
|---|---|
| Creator ID | 4 byte unsigned integral value |
| Type ID | 4 byte unsigned integral value |
| Database Name Length | 4 byte unsigned integral value |
| Database Name Value | N UTF-8 bytes |

In the present embodiment, the Sync Protocol Version element provides a mechanism to indicate that a particular implementation supports a corresponding set of composite elements and messages such as those described herein. It also specifies the representation for those elements and messages. In one embodiment, the Sync Protocol Version element is represented as follows:

Major Version 4 byte unsigned integral value
Minor Version 4 byte unsigned integral value In the present embodiment, the major version is 0x00000001 and the minor version is 0x00000000.

In the present embodiment, a Cancel element provides a mechanism to deliver an error code and error message when canceling a synchronization session or when canceling synchronization of a specified database. In one embodiment, the Cancel element is represented as:

| | |
|---|---|
| Error Code | 4 byte unsigned integral value |
| Error Message Length | 4 byte unsigned integral value |
| Error Message Value | N UTF-8 bytes |

In the present embodiment, a Query/Expertise element is a composite structure consisting of Pedigree, Content, Category, Data, and Application filters. A list of such elements constitutes a Query/Expertise object. In one embodiment, the data representation for the Query/Expertise element is defined as:

| | |
|---|---|
| Pedigree | VARIABLE |
| Query/Expertise Flag | BYTE |
| Query Type Flag | BYTE |
| Content Flag | BYTE |
| Number of Category GUIDs | 4 byte unsigned integral value (X) |
| List of Category GUIDs | X*16 bytes |
| Number of Record GUIDs | 4 byte unsigned integral value (Y) |
| List of Record GUIDs | Y*16 bytes |
| Length of application data | 4 byte unsigned integral value (N) |
| Application data array | N bytes |

The Query/Expertise flag in this element identifies whether the element is a query, an expertise or both. In most cases, the query and expertise elements will be the same. This allows for optimization at the protocol level. The Query/Expertise flag is a bit-wise OR of the following values:

0x01 Query Element
0x02 Expertise Element

The term "expertise" is used to define which queries a node is able to answer. A query conveys "For data set X, what changes do you have that lie outside of coverage Y?" An expertise statement conveys "For data set X, I have all of the changes within coverage Y." A typical node includes both a Query element and an Expertise element in a message, because it wants to know about data set X for which it has coverage Y; the node wants to receive changes outside of this coverage and can provide changes inside of this coverage. For efficiency the Query element and the Expertise element may be combined. A typical node will include both its expertise and a query in a message because, during synchronization, the node is both providing and receiving information.

If the responding node (device) has no expertise, then none of the Query/Expertise elements in a message will have the Expertise flag set. If the responding node (device) has all expertise, then there will be a Query/Expertise element with only the Expertise flag set, the appropriate pedigree specified, and no category and record GUIDs listed. In this case, none of the remaining Query/Expertise elements may have the Expertise flag set.

In the present embodiment, the Query Type flag is used to qualify the Query element. It does not qualify an Expertise element. For a Query element, it identifies if the element is part of pre-question or post-question.

| Query Type Flag | Description |
|---|---|
| 0x00 | None |
| 0x01 | Pre-question |
| 0x02 | Post-question |

In the present embodiment, the Content flag is a bit-wise OR of the following values:

| Content Flag | Description |
|---|---|
| 0x01 | Global |
| 0x02 | Category |
| 0x04 | Record/Object/Data |
| 0x08 | Link |

In the present embodiment, an Update element provides data description for an update. A list of such elements constitutes an Update object. In one embodiment, the data representation for the element is as follows:

| | |
|---|---|
| Record GUID | 16 bytes |
| Category GUID | 16 bytes |
| Number of Objects in Inclusion List | 4 byte unsigned integral value (N) |
| List of Object GUIDs | N*16 bytes |
| Pedigree | VARIABLE |
| Status | BYTE |
| Content Length | 4 byte unsigned integral value (X) |
| Content | X bytes |

Based on the identity of the Update element, the Content field may refer to record data, category data or global data such as application information, schema information, etc. The Content field includes application-specific data that are opaque to the synchronization protocol.

In the present embodiment, Status identifies if an object was deleted, or deleted and archived.

| Status | Description |
| --- | --- |
| 0x00 | Present |
| 0x01 | Deleted |
| 0x02 | Archived |

In the present embodiment, an End element represents the last element in a list of elements of the same type in a message. The Element Length field has zero value. The End element is generally used as the sentinel element for a list of Query/Expertise or Update elements. This allows packaging of an array of elements without knowing the total number of elements.

Exemplary Messages

In the present embodiment, the order of elements in a message 320 (FIG. 3B) is important. Each message begins with a 'Start Message' element and ends with an 'End Message' element. In the present embodiment, a message 320 will contain session information. Table 3 is a list of the types of messages according to one embodiment of the present invention. It is appreciated that other message types can be defined and added to the list.

TABLE 3

Exemplary Message Types

| Message Type | Description |
| --- | --- |
| 0x0800 | Request Query |
| 0x0801 | Query Response |
| 0x0802 | Request Update |
| 0x0803 | Update Response |
| 0x0804 | Update Report |
| 0x0805 | Update Acknowledge |
| 0x0806 | Cancel Session |
| 0x0807 | Cancel Database Sync |

In the present embodiment, an originating node sends a Request Query message to a responding node to determine the responding node's queries and expertise. In one embodiment, the Request Query message includes the following composite elements:

Start Message Element (Request Query)
User Context Element
Database Identifier Element
Sync Protocol Version Element
Query Elements (one or more)
End Element
End Message Element In this embodiment of a Request Query message, none of the Query/Expertise elements will have the Expertise flag set. All of these elements will also have their Pedigree set to NULL.

In the present embodiment, the responding node sends a Query Response message to the originating node in response to a Request Query message. In one embodiment, the Query Response message includes the following composite elements:

Start Message Element (Query Response)
User Context Element
Database Identifier Element
Sync Protocol Version Element
Query/Expertise Elements (one or more)
End Element
End Message Element In the present embodiment, if the responding node only wants modifications from other data nodes and it does not want to communicate modifications from its local data store, it will state that it has no expertise. In that case, none of the Query/Expertise elements will have Expertise flag set.

According to the present embodiment, the originating node sends a Request Update message to the responding node based on the queries from other nodes and the expertise of the responding node. In one embodiment, the Request Update message includes the following composite elements:

Start Message Element (Request Update)
User Context Element
Database Identifier Element
Sync Protocol Version Element
Query Elements (zero or more)
End Element (Optional)
End Message Element If the responding node has no expertise, then either the Query round is skipped or the number of Query elements in this message is zero. If there are no Query elements in this message, then the End element is optional.

In the present embodiment, the responding node sends an Update Response message to the originating node in response to a Request Update message. In one embodiment, the Update Response message includes the following composite elements:

Start Message Element (Update Response)
User Context Element
Database Identifier Element
Sync Protocol Version Element
Query Elements (Pre-question) (zero or more)
End Element (Optional)
Update Elements (zero or more)
End Element (Optional)
Query Elements (Post-question) (zero or more)
End Element (Optional)
End Message Element If there are no modifications in the local data store of the responding node or the number of Query elements in the "Request Update" message is zero, then the number of update elements to be communicated may be zero. If there are no Update elements in this message, then the End element is optional.

The originating node sends an Update Report message to the responding node in the Report round to modify its local data store. In one embodiment, the Update Report message includes the following composite elements:

Start Message Element (Update Report)
User Context Element
Database Identifier Element
Sync Protocol Version Element
Query Elements (Pre-question) (zero or more)
End Element (Optional)
Update Elements (zero or more)
End Element (Optional)
Query Elements (Post-question) (zero or more)
End Element (Optional)
End Message Element In this embodiment, pre-question is the same as the initial query, and post-question is the query that got answered.

Essentially, these are Query/Expertise elements with coverage. The Update Response message and the Update Report message can contain both pre-question and post-question elements.

Figure 4:
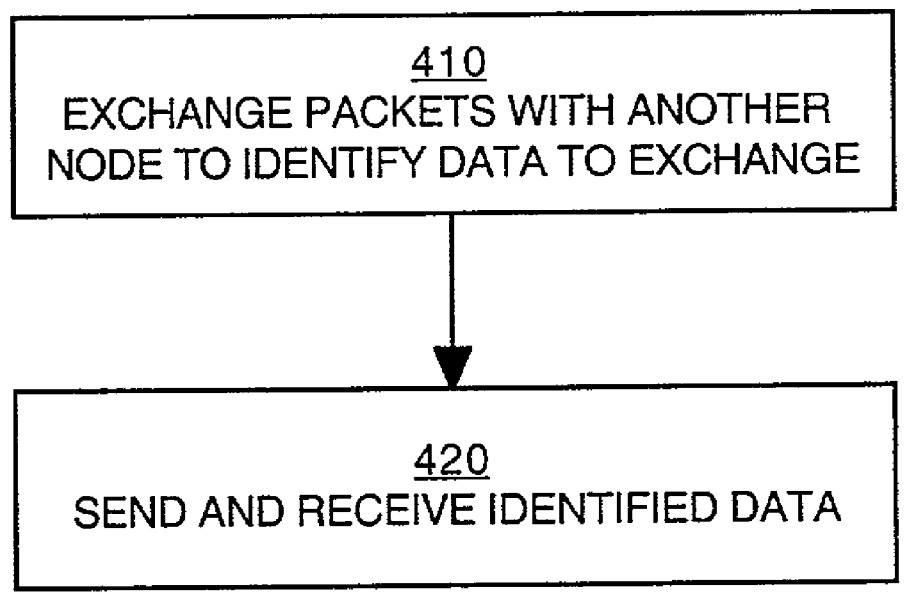
FIG. 4 is a flowchart of method for synchronizing a data set in accordance with one embodiment of the present invention.

In the present embodiment, the responding node sends an Update Acknowledge message to the requesting node in response to an Update Report message. In one embodiment, the Update Acknowledge message includes the following composite elements:
  Start Message Element (Update Acknowledge)
  User Context Element
  Database Identifier Element
  Sync Protocol Version Element
  End Message Element In the present embodiment, a Cancel Session message may be sent by either node to end the sync session. A responding node may send this message to the originating node when a user cancels the sync operation at his or her end or if there is some type of fatal error. An originating node may send this message to the responding node in situations when it is not possible to continue to sync. The Cancel Session message may be sent in any packet at any time after the Start Packet element and before the End Packet element. In one embodiment, the Cancel Session message includes the following composite elements:
  Start Message Element (Cancel Session)
  User Context Element
  Sync Protocol Version Element
  Cancel Element
  End Message Element In the present embodiment, a Cancel Database Sync message may be sent by either node to end the synchronization of the specified database. Either node may send this message to the other node when the user indicates to that synchronization of the database should be skipped or canceled. This message may also be sent when there is some error and it is not possible to continue to sync the database. The Cancel Database Sync message may be sent in any packet at any time after the Start Packet element and before the End Packet element. Synchronization of the next database may then proceed. In one embodiment, the Cancel Database Sync message includes the following composite elements:
  Start Message Element (Cancel Database Sync)
  User Context Element
  Database Identifier Element
  Sync Protocol Version Element
  Cancel Element
  End Message Element
  Synchronization Scenarios FIG. 4 is a flowchart 400 of a method for synchronizing a data set in accordance with one embodiment of the present invention. The data set being synchronized can exist on multiple nodes. That is, for example, the data set may pertain to an address book, and an address book data set can reside on each node. According to this example, the point of the synchronization is to synchronize selected data objects/records residing in the address book data set on one node with selected data objects/records residing in the address book data set residing on another node.

For simplicity of discussion, flowchart 400 is discussed in the context of a synchronization performed between two nodes, such as device 100 and computer system 120 of FIG. 2. In the present embodiment, the method of flowchart 400 is implemented on one of the nodes. It is appreciated that the applicability of flowchart 400 can be extended to synchronization of more than two nodes. Furthermore, although specific steps are disclosed in flowchart 400, such steps are exemplary. That is, embodiments of the present invention are well suited to performing various other steps or variations of the steps recited in flowchart 400. It is appreciated that the steps in flowchart 400 may be performed in an order different than presented, and that not all of the steps in flowchart 400 may be performed.

In the present embodiment, in step 410 of FIG. 4, one node (e.g., the first node) exchanges packets 310 (FIG. 3A) with another node (e.g., the second node). A packet comprises one or more messages and a message comprises a plurality of elements. At least one of the elements identifies the data set. In one embodiment, the packet also includes a session identifier. In another embodiment, the packet also includes version information identifying a version of a synchronization protocol used by the first node. Other information in the packets is used to identify any data from the data set that needs to be sent to the second node and any data from the data set that needs to be received from the second node, in order to synchronize the data set on both nodes.

In step 420 of FIG. 4, in the present embodiment, the data so identified can then be exchanged. In one embodiment, data are streamed to the second node in blocks of data that are sized according to the size of an outbound buffer. Data can be streamed as the data become available. On the receiving end, data are read and processed until an end-of-packet element is received.

In another embodiment, the data are compressed before being sent to the second node. Compression may be done either at the transport layer or the sync protocol layer, or compression may be introduced as a layer between the transport and sync protocol layers. In one such embodiment, a block-based blind compression scheme substantially based on LZ77 (Lempel-Ziv 1977) is used. LZ77 presumes no knowledge of the sync protocol and sync elements therein. It is not content-aware and it considers input data as arbitrary sequence of bytes. It is appreciated that schemes based on something other than LZ77 may instead be used.

In another embodiment, a content-aware approach is used to achieve compression. Common items are identified from the information to be transmitted, the items of one kind are placed in a separate table, the tables are sorted in numerical order, the items in a table are difference encoded, references to items are replaced with the index of the corresponding table item, and the entire data set is nibble encoded.

In this latter embodiment, compression is tightly coupled to the synchronization protocol. The tables of common items are transmitted before the sync data are sent. To support streaming, items may be dynamically added to these tables. For example, when a commonly occurring item is seen for the first time, it is sent as-is along with a tag. Subsequent occurrences of that item are replaced with the tag. In this manner, both nodes dynamically build a dictionary when they see a tag associated with an item. Both nodes can decide when to dump their dictionaries and begin afresh in order to limit the amount of state information. For example, the dictionary can be dumped at the end of a data block, the end of a message, the end of a packet, the end of one database sync, etc.

In one embodiment, a second packet can be sent subsequent to sending a first packet before a response to the first packet is received. That is, because packets can include more than one message, messages (e.g., commands) can be batched in a single packet, and as such the number of transactions can be reduced. Also, a first message can be sent in a first packet and, while waiting for a response to the first message, a second message can be sent in another packet. In general, it is not necessary to wait for a response to a first message before sending a second message, which can contribute to faster syncs.

The method of flowchart 400 (FIG. 4) is further described by way of example using the data flow diagrams of FIGS. 5A, 5B, 5C and 5D. In each of these embodiments, the originating node 510 can be either device 100 or computer system 120 of FIGS. 1A and 1B, respectively, and the responding node 520 likewise can be either device 100 or computer system 120. For clarity, only two nodes are illustrated and discussed; however, it will be understood that the embodiments of the present invention can be extended to more than two nodes.

Figure 5A:
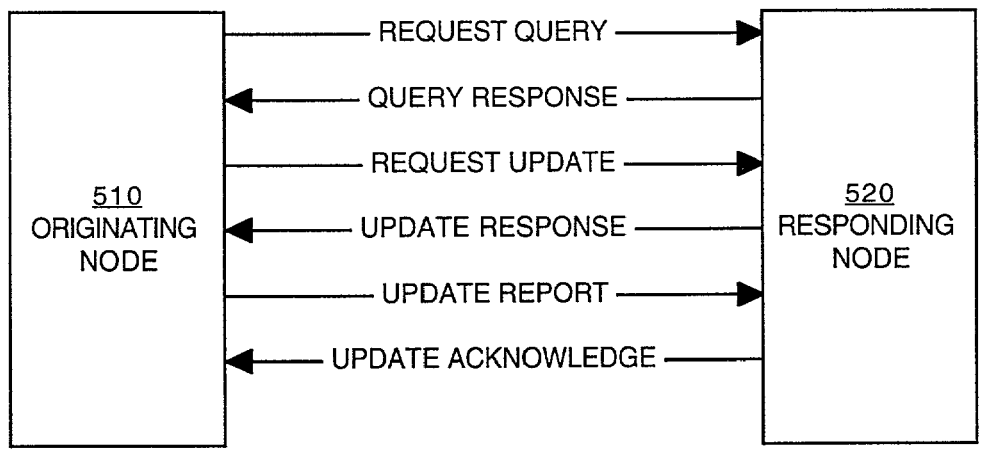
FIGS. 5A, 5B, 5C and 5D are data flow diagrams illustrating different types of synchronization performed according to embodiments of the present invention.

With reference first to FIG. 5A, sync nodes 510 and 520 exchange information about the modified data since last sync operation. A sync packet 310 (FIG. 3A) usually consists of a single sync message 320 (FIG. 3B) in this type of sync. For the sake of simplicity, the discussion will focus on the sync packet communication between two nodes only.

Continuing with reference to FIG. 5A, originating node 510 sends a Request Query message to responding node 520. This message identifies the data set being synched. Responding node 520 will determine the coverage of this data set in its local data store and send its query and expertise information as a Query Response message to originating node 510. Usually, the query and expertise elements are the same in this type of sync. The originating node 510 collects this information from any other participating sync nodes. Based on the expertise of responding node 520, originating node 510 requests modifications from responding node 520 by sending appropriate query elements in a Request Update message. Responding node 520 interprets these query elements, locates the matching data in its database, and sends the data updates to originating node 510 in an Update Response message. Responding node 520 also includes a reference to the initial query as well as the coverage of the answered part of the query in the Update Response message. Originating node 510 collects all the updates from other participating sync nodes and, based on the coverage of responding node 520, determines the modifications that the responding node 520 has not seen. Originating node 510 packages these modifications in an Update Report message and sends them to responding node 520. Responding node 520 applies the modifications to its local data store and also updates the local coverage information at the completion of the sync. Responding node 520 then sends an Update Acknowledge message to originating node 510 to signal sync completion.

Figure 5B:
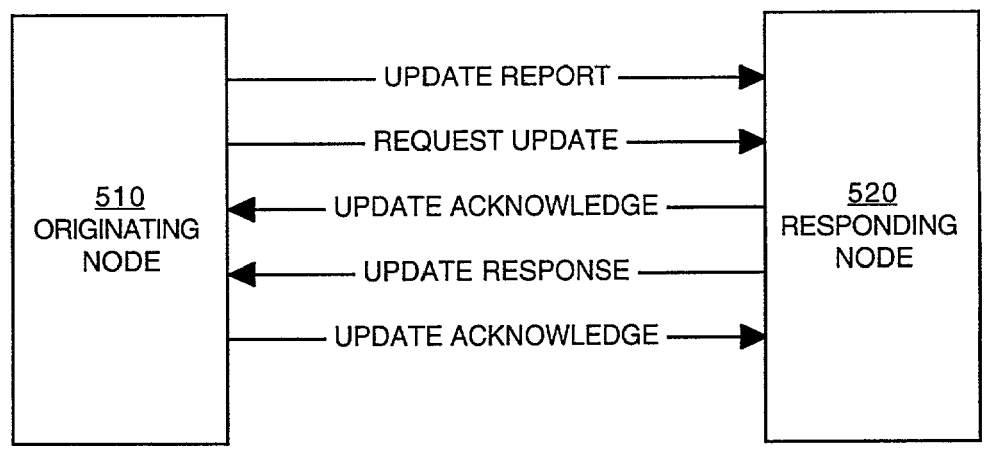

Referring now to FIG. 5B, an embodiment is described that achieves efficient and optimized wireless synchronization by requiring as few transactions as possible, thereby minimizing delay due to network latency. In this embodiment, sync packet 310 (FIG. 3A) consists of multiple sync messages 320 (FIG. 3B). In this embodiment, it is assumed that the two sync nodes 510 and 520 have performed a full sync at an earlier time.

With reference to FIG. 5B, an application on originating node 510 decides the data set to be synched. Originating node 510 presumes the knowledge of coverage of this data on the responding node 520 by retaining the coverage from the previous sync. Based on this, originating node 510 determines the changes in its local database that responding node 520 might not have seen. Originating node 510 packages these updates, the presumed query, and the coverage of the data set being synched in an Update Report message. Originating node 510 also determines the coverage of the data set in its local database and constructs a Request Update message to request modifications from responding node 520 that originating node 510 has not seen. The Update Report and Request Update messages are put in a single sync packet 310 and sent to responding node 520. Responding node 520 extracts the modifications from the Update Report message, applies changes that it has not seen to its database, and updates/merges the coverage as well. Responding node 520 constructs an Update Acknowledge message to indicate that it has applied the modifications at its end. Based on the query elements in the Request Update message, responding node 520 determines the matching data from its local database. Responding node 520 also determines the actual query that originating node 510 had presumed as well as the coverage of modifications being sent to originating node 510. Responding node 520 creates an Update Response message with this information. The Update Acknowledge and Update Response messages are put in a single sync packet 310 and sent to originating node 510. Originating node 510 applies the updates to its local database and also retains the coverage of responding node 520 for the data set being synched. This embodiment of synchronization can be referred to as "one-up one-down synchronization." In one embodiment, originating node 510 sends an Update Acknowledge message to responding node 520, but this message may be omitted as an optimization.

In the present embodiment, if the coverage of responding node 520 that is presumed by originating node 510 is lower than the actual value, it results in originating node 510 sending more updates then necessary to responding node 520. However, if the presumed server coverage is greater than the actual value, there exist some modifications on originating node 510 that responding node 520 might not have seen. In this case, originating node 510 determines the data in its local database that lies in the coverage range, puts them in an Update Report message, and sends it to responding node 520, as described above.

Figure 5C:
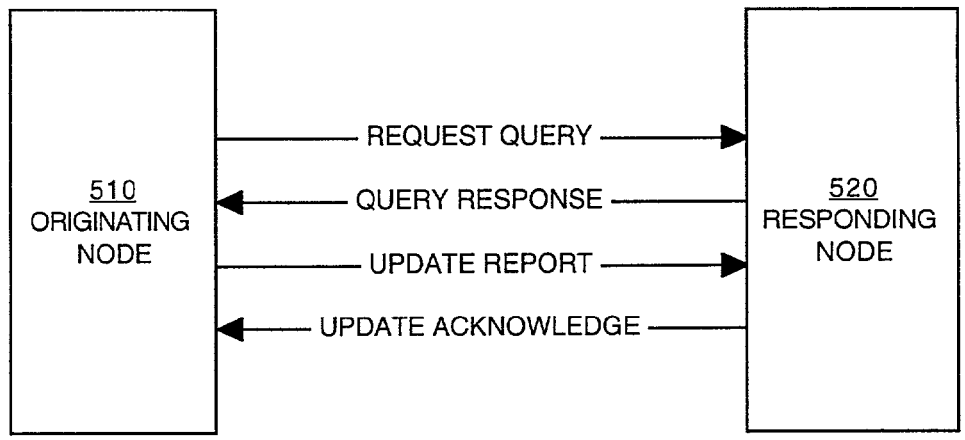

Now with reference to FIG. 5C, in this embodiment, responding node 520 gets modifications from originating node 510 but responding node 520 does not send its modifications to originating node 510. Originating node 510 sends a Request Query message to responding node 520. In the present embodiment, this message identifies the data set being synched. Responding node 520 will indicate that it has no expertise and send its query as a Query Response message to the originating node 510. In response, originating node 510 determines the modifications that responding node 520 has not seen, packages them along with the coverage information in an Update Report message, and sends the Update Report message to responding node 520. Responding node 520 applies the modifications to its local data store and also updates the local coverage information at the completion of the sync. Responding node 520 can then send an Update Acknowledge message to signal sync completion to originating node 510.

Figure 5D:
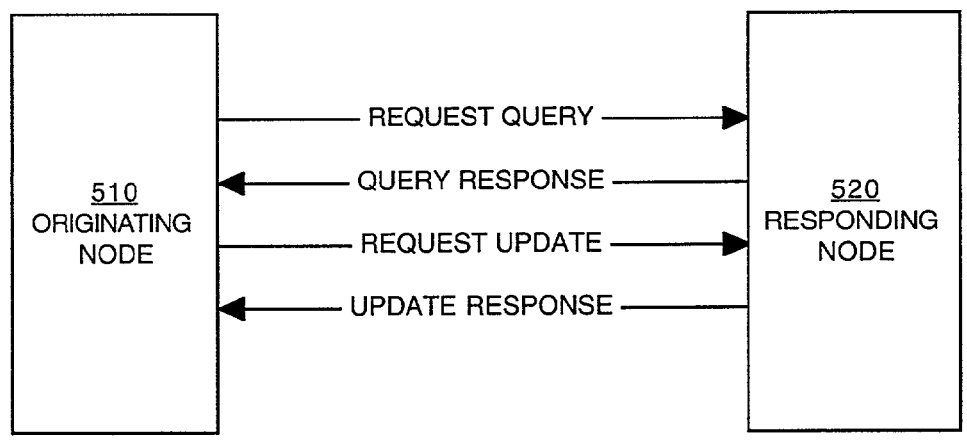

With reference now to FIG. 5D, in this embodiment, responding node 520 sends its modifications to originating node 510, but originating node 510 does not send its modifications back to responding node 520. Originating node 510 sends a Request Query message to responding node 520. In the present embodiment, this message identifies the data set being synched. Responding node 520 will indicate that it has no query but full expertise and it will send this information as a Query Response message to originating node 510. Based on the expertise and coverage of the responding node 520, originating node 510 creates appropriate query elements and sends them in a Request Update message to responding node 520. Responding node 520 interprets these query elements, locates the matching data in its database, and sends the data to originating node 510 in an Update Response message. Originating node 510 applies the modifications to its local data store and also updates the local coverage information at the completion of the sync.

Exemplary Application Programming Interfaces

The embodiments of the synchronization protocol described herein define the format for communicating sync data between software components on two nodes, for example, between agent 205 on computer system 120 and sync manager 211 on device 100 (FIG. 2). In the present embodiment, both of these software components use the synchronization protocol API to read and write sync packets. In this embodiment, these software components initialize the sync protocol with a handle to an open transport channel. The sync protocol provides an API to release the protocol resources. A writer API allows an application to dynamically construct sync packets and stream the data to the other node. A reader API permits a node to read the data as it comes, parse the data to construct sync records/objects, and hand the records/objects over to an application for further processing.

Thus, the synchronization protocol includes a writer API and a reader API. The synchronization protocol also includes an API that is common to the writer API and the reader API. The common API is described below, followed by a description of the writer API then the reader API.

Exemplary Common Application Programming Interface

In the present embodiment, the synchronization protocol includes an API that is common to the writer API and the reader API. It is appreciated that other API methods can be defined and added to those described herein.

SyncProtocolInit

| | |
|---|---|
| Purpose | Initializes the sync protocol for sending and receiving sync packets. Both participating nodes call this method. |
| Prototype | SYNC_PROTOCOL_HANDLE SyncProtocolInit (TRANSPORT_HANDLE hTransport) |
| Parameters | hTransport Input parameter. Refers to a channel opened for synchronization. |
| Result | Returns a handle to the sync protocol object. A NULL value indicates failure. |
| Pre-conditions | The transport handle must refer to an open channel. |
| Side Effects | Allocates memory for the sync protocol object. The application must call SyncProtocolReleaseHandle to free the acquired resources. |
| Comments | It should be called after the handshake for sync has been completed |

SyncProtocolReleaseHandle

| | |
|---|---|
| Purpose | Invalidates the sync protocol object. Both participating nodes call this method. |
| Prototype | ERR SyncProtocolReleaseHandle (SYNC_PROTOCOL_HANDLE hSyncProtocol) |
| Parameters | hSyncProtocol Input parameter. Refers to the handle to sync protocol object |
| Result | Returns 0, if successful. |
| Pre-conditions | The sync protocol handle must have been earlier returned by the function call SyncProtocolInit. |
| Side Effects | Releases the resources associated with sync protocol object. |
| Comments | It should be called after the synchronization has been completed. |

Exemplary Writer Application Programming Interface

In the present embodiment, the synchronization protocol includes a writer API. It provides a set of APIs to create a sync packet from various sync messages and elements. A writer method checks if the packet has enough elements to fill the maximum buffer size available from the transport, and if it determines so, it flattens the elements and calls a transport API to send the data block. The following methods comprise the writer interface of the sync protocol API. It is appreciated that other API methods can be defined and added to those described herein.

SyncProtocolAddStartPacket

| | |
|---|---|
| Purpose | Adds a Start Packet element to the sync packet |
| Prototype | ERR SyncProtocolAddStartPacket (SYNC_PROTOCOL_HANDLE hSyncProtocol) |
| Parameters | hSyncProtocol Input parameter. Refers to the handle to sync protocol object |
| Result | Returns 0, if successful. |
| Pre-conditions | The sync protocol handle must have been earlier returned by the function call SyncProtocolInit. |
| Side Effects | None |
| Comments | It should be the first writer API called when constructing a sync packet. |

SyncProtocolAddEndPacket

| | |
|---|---|
| Purpose | Adds an End Packet element to the sync packet |
| Prototype | ERR SyncProtocolAddEndPacket (SYNC_PROTOCOL_HANDLE hSyncProtocol) |
| Parameters | hSyncProtocol Input parameter. Refers to the handle to sync protocol object |
| Result | Returns 0, if successful. |
| Pre-conditions | The sync protocol handle must have been earlier returned by the function call SyncProtocolInit. |
| Side Effects | It uses the transport handle to send the remaining bytes in the sync packet. |
| Comments | It should be the last writer API called when constructing a sync packet. |

SyncProtocolAddStartMessage

| | |
|---|---|
| Purpose | Adds a Start Message element for the specified message type to the sync packet |
| Prototype | ERR SyncProtocolAddStartMessage (SYNC_PROTOCOL_HANDLE hSyncProtocol, MESSAGE_TYPE mesgType) |
| Parameters | hSyncProtocol Input parameter. Refers to the handle to sync protocol object |
| | mesgType Input parameter. Type of the message |
| Result | Returns 0, if successful. |
| Pre-conditions | The sync protocol handle should be valid and must have been earlier returned by the function call SyncProtocolInit. |
| Side Effects | None |
| Comments | It is the first element that marks the beginning of a sync message. |

SyncProtocolAddEndMessage

| | |
|---|---|
| Purpose | Adds an End Message element for the current message in the sync packet |
| Prototype | ERR SyncProtocolAddEndMessage (SYNC_PROTOCOL_HANDLE hSyncProtocol) |
| Parameters | hSyncProtocol Input parameter. Refers to the handle to sync protocol object |

-continued

| | |
|---|---|
| Result | Returns 0, if successful. |
| Pre-conditions | The sync protocol handle should be valid and must have been earlier returned by the function call SyncProtocolInit. |
| Side Effects | None |
| Comments | It is the last element that marks the end of a sync message. |

SyncProtocolAddUserContextElement

| | | |
|---|---|---|
| Purpose | Adds a User Context element to the current message in the sync packet | |
| Prototype | ERR SyncProtocolAddUserContextElement (SYNC_PROTOCOL_HANDLE hSyncProtocol, USER_CONTEXT_HANDLE hUserContext) | |
| Parameters | hSyncProtocol | Input parameter. Refers to the handle to sync protocol object |
| | hUserContext | Input parameter. Handle to an object that uniquely identifies the user context (session information) |
| Result | Returns 0, if successful. | |
| Pre-conditions | The sync protocol handle should be valid and must have been earlier returned by the function call SyncProtocolInit. | |
| Side Effects | None | |
| Comments | None | |

SyncProtocolAddSessionIDElement

| | | |
|---|---|---|
| Purpose | Adds a Session ID element to the current message in the sync packet | |
| Prototype | ERR SyncProtocolAddSessionIDElement (SYNC_PROTOCOL_HANDLE hSyncProtocol, SESSIONID_HANDLE hSession) | |
| Parameters | hSyncProtocol | Input parameter. Refers to the handle to sync protocol object |
| | hSession | Input parameter. Handle to an object that uniquely identifies the sync session |
| Result | Returns 0, if successful. | |
| Pre-conditions | The sync protocol handle should be valid and must have been earlier returned by the function call SyncProtocolInit. | |

-continued

| | |
|---|---|
| Side Effects | None |
| Comments | None |

SyncProtocolAddDatabaseIdentifierElement

| | | |
|---|---|---|
| Purpose | Adds a Database Identifier element to the current message in the sync packet | |
| Prototype | ERR SyncProtocolAddDatabaseIdentifierElement (SYNC_PROTOCOL_HANDLE hSyncProtocol, DATABASE_HANDLE hDatabase) | |
| Parameters | hSyncProtocol | Input parameter. Refers to the handle to sync protocol object |
| | hDatabase | Input parameter. Handle to an object that uniquely identifies the database |
| Result | Returns 0, if successful. | |
| Pre-conditions | The sync protocol handle should be valid and must have been earlier returned by the function call SyncProtocolInit. | |
| Side Effects | None | |
| Comments | None | |

SyncProtocolAddVersionElement

| | | |
|---|---|---|
| Purpose | Adds a Sync Protocol Version element to the current message in the sync packet | |
| Prototype | ERR SyncProtocolAddVersionElement (SYNC_PROTOCOL_HANDLE hSyncProtocol, VERSION_HANDLE hVersion) | |
| Parameters | hSyncProtocol | Input parameter. Refers to the handle to sync protocol object |
| | hVersion | Input parameter. Handle to an object that identifies the sync protocol version |
| Result | Returns 0, if successful. | |
| Pre-conditions | The sync protocol handle should be valid and must have been earlier returned by the function call SyncProtocolInit. | |
| Side Effects | None | |
| Comments | None | |

SyncProtocolAddQueryElement

| | | |
|---|---|---|
| Purpose | Adds a Query element to the current message in the sync packet | |
| Prototype | ERR SyncProtocolAddQueryElement (SYNC_PROTOCOL_HANDLE hSyncProtocol, QUERY_ELEMENT_HANDLE hQuery, QUERY_EXPERTISE_FLAG fQueryExpertise, QUERY_TYPE_FLAG fQueryType) | |
| Parameters | hSyncProtocol | Input parameter. Refers to the handle to sync protocol object. |
| | hQuery | Input parameter. Handle to a query element object. |
| | fQueryExpertise | Input parameter. When this query element is being added as part of 'Query Response' message, it is used to identify if it is a Query or Expertise element or both. When it is added as part of any other message, it is always a Query element. |
| | fQueryType | Input parameter. When this Query element is being added as part of 'Update Response' or 'Update Report' message, the flag specifies if it belongs to 'pre-question' or 'post-question'. |
| Result | Returns 0, if successful. | |
| Pre-conditions | The sync protocol handle should be valid and must have been earlier returned by the function call SyncProtocolInit. | |
| Side Effects | None | |
| Comments | None | |

SyncProtocolAddUpdateElement

| | |
|---|---|
| Purpose | Adds an Update element to the current message in the sync packet |
| Prototype | ERR SyncProtocolAddUpdateElement (SYNC_PROTOCOL_HANDLE hSyncProtocal, DATABASE_HANDLE hDatabase, UPDATE_ELEMENT_HANDLE hUpdate, UPDATE_READ_CALLBACK fnReadCallback, VOID* pState) |
| Parameters | hSyncProtocol — Input parameter. Refers to the handle to sync protocol object<br>hDatabase — Input parameter. Handle to the database of the update element. Passed as an argument to the read callback method.<br>hUpdate — Input parameter. Handle to an update element object.<br>fnReadCallback — Input parameter. The callback method provided by an application to read data from an offset in the Update element.<br>pState — Input parameter. This shall be passed as an argument to the update read callback method. |
| Result | Returns 0, if successful. |
| Pre-conditions | The sync protocol handle should be valid and must have been earlier returned by the function call SyncProtocolInit. |
| Side Effects | None |
| Comments | An Update element may have a large amount of data to be sent to the other node, all of which cannot be send in one block. The data needs to be streamed and UPDATE_READ_CALLBACK method provides a mechanism for Sync Protocol to request the Application for reading data from an offset in the Update element.<br>The Update element may contain the data in itself. In that case, NULL should be passed for this callback method. If the Update element does not contain data and the size of data is greater than zero, UPDATE_ELEMENT_HANDLE represents reference to an Update element and the callback method must be specified to read the content for the Update element. The callback method is used to read only the content part of the Update element incrementally, and does not apply to other fields. The signature of the UPDATE_READ_CALLBACK would look like:<br>ERR ReadUpdateElement (DATABASE_HANDLE hDatabase, UPDATE_ELEMENT_HANDLE hUpdate, DWORD dwReadOffset, DWORD dwBytesToRead, UCHAR* pBuffer, DWORD* pdwBytesRead, VOID* pState) |

(Note: DWORD is used to refer to a 4 byte unsigned integral value.)

SyncProtocolAddEndElement

| | |
|---|---|
| Purpose | Adds an End element to specify the end of the list of Query/Update elements in the current message in the sync packet. |
| Prototype | ERR SyncProtocolAddEndElement (SYNC_PROTOCOL_HANDLE hSyncProtocol) |
| Parameters | hSyncProtocol — Input parameter. Refers to the handle to sync protocol object |
| Result | Returns 0, if successful. |
| Pre-conditions | The sync protocol handle should be valid and must have been earlier returned by the function call SyncProtocolInit. |
| Side Effects | None |
| Comments | None |

SyncProtocolAddCancelElement

| | |
|---|---|
| Purpose | Adds a Cancel element to the current message in the sync packet |
| Prototype | ERR SyncProtocolAddCancelElement (SYNC_PROTOCOL_HANDLE hSyncProtocol, CANCEL_HANDLE hCancel) |
| Parameters | hSyncProtocol — Input parameter. Refers to the handle to sync protocol object<br>hCancel — Input parameter. Handle to an object that provides details on why a cancel is being requested for the specified session or database. |
| Result | Returns 0, if successful. |

-continued

| | |
|---|---|
| Pre-conditions | The sync protocol handle should be valid and must have been earlier returned by the function call SyncProtocolInit. |
| Side Effects | None |
| Comments | None |

SyncProtocolAddGenericElement

| | |
|---|---|
| Purpose | Adds a user-defined element of the specified type to the current message in the sync packet |
| Prototype | ERR SyncProtocolAddGenericElement (SYNC_PROTOCOL_HANDLE hSyncProtocol, DATABASE_HANDLE hDatabase, ELEMENT_TYPE eType, GENERIC_ELEMENT_HANDLE[1] hElement, DWORD dwElementSize, GENERIC_READ_CALLBACK fnReadCallback, VOID* pState) |
| Parameters | hSyncProtocol — Input parameter. Refers to the handle to sync protocol object<br>hDatabase — Input parameter. Handle to the database of the generic element. Passed as an argument to the read callback method.<br>eType — Input parameter. Element type of the user-defined element.<br>hElement — Input parameter. Handle to the user-defined element object.<br>dwElementSize — Input parameter. The number of bytes required for storing the flattened object. |

-continued

|  | fnReadCallback | Input parameter. The callback method provided by an application to read data from an offset in the generic element. |
|---|---|---|
|  | pState | Input parameter. This shall be passed as an argument to the generic read callback method. |
| Result | Returns 0, if successful. | |
| Pre-conditions | The sync protocol handle should be valid and must have been earlier returned by the function call SyncProtocolInit. | |
| Side Effects | None | |
| Comments | A user-defined element may have a large amount of data to be sent to the other node, all of which cannot be send in one block. The read callback method allows reading a specified number of bytes from a given offset in the element. The pState parameter along with GENERIC_ELEMENT_HANDLE should contain enough information so that callback method can be used to read data from it. The signature of GENERIC_READ_CALLBACK method for user-defined element should be: ERR ReadGenericElement (DATABASE_HANDLE hDatabase, GENERIC_ELEMENT_HANDLE hElement, DWORD dwReadOffset, DWORD dwBytesToRead, UCHAR* pBuffer, DWORD* pdwBytesRead, VOID* pState) This method is implemented by the third party component that defines the element. It allows reading a specified number of bytes from a given offset in the element. It is used by Sync Protocol implementation to read data for an element so as to stream it on the wire. | |

[1] It is of type VOID*

SyncProtocolFlushData

| Purpose | This method can be called anytime to force sending of data over the transport. |
|---|---|
| Prototype | ERR SyncProtocolFlushData (SYNC_PROTOCOL_HANDLE hSyncProtocol) |
| Parameters | hSyncProtocol Input parameter. Refers to the handle to sync protocol object |
| Result | Returns 0, if successful. |
| Pre-conditions | The sync protocol handle should be valid and must have been earlier returned by the function call SyncProtocolInit. |
| Side Effects | None |
| Comments | This method sends data to the other end even though the number of bytes is not enough to fill the transport buffer. An application may want to send a configured or pre-determined number of updates to the other node in each block of data. This method facilitates such an implementation. |

SyncProtocolAddRequestQueryMessage

| Purpose | Adds "Request Query" message to the protocol object. Only the originating node calls this method. |
|---|---|
| Prototype | ERR SyncProtocolAddRequestQueryMessage (SYNC_PROTOCOL_HANDLE hSyncProtocol, USER_CONTEXT_HANDLE hUserContext, DATABASE_HANDLE hDatabase, VERSION_HANDLE hVersion, QUERY_HANDLE hQuery) |
| Parameters | hSyncProtocol Input parameter. Refers to the handle to sync protocol object |
|  | hUserContext Input parameter. Handle to an object that uniquely identifies the user context |
|  | hDatabase Input parameter. Handle to an object that uniquely identifies the database |
|  | hVersion Input parameter. Handle to sync protocol version object |
|  | hQuery Input parameter. Handle to the query object. It provides the rule to define or restrict the data set. |
| Result | Returns 0, if successful. |
| Pre-conditions | The sync protocol handle should be valid and must have been earlier returned by the function call SyncProtocolInit. |
| Side Effects | None |
| Comments | This method is equivalent to the following algorithm: SyncProtocolAddStartMessage(hSyncProtocol, REQUEST_QUERY) SyncProtocolAddUserContextElement(hSyncProtocol, hUserContext) SyncProtocolAddDatabaseIdentifierElement (hSyncProtocol, hDatabase) SyncProtocolAddVersionElement(hSyncProtocol, hVersion) DO; There must be at least one Query element SyncProtocolAddQueryElement(hSyncProtocol, hQueryElement, QUERY_FLAG, NONE_FLAG) WHILE (More Query elements) SyncProtocolAddEndElement (hSyncProtocol) SyncProtocolAddEndMessage(hSyncProtocol) |

SyncProtocolAddQueryResponseMessage

| Purpose | Adds "Query Response" message to the protocol object. Only the responding node calls this method. |
|---|---|
| Prototype | ERR SyncProtocalAddQueryResponseMessage (SYNC_PROTOCOL_HANDLE hSyncProtocol, USER_CONTEXT_HANDLE hUserContext, DATABASE_HANDLE hDatabase, VERSION_HANDLE hVersion, QUERY_HANDLE hQuery, QUERY_HANDLE hExpertise) |
| Parameters | hSyncProtocol Input parameter. Refers to the handle to sync protocol object |
|  | hUserContext Input parameter. Handle to an object that uniquely identifies the user context |
|  | hDatabase Input parameter. Handle to an object that uniquely identifies the database |
|  | hVersion Input parameter. Handle to sync protocol version object |
|  | hQuery Input parameter. Handle to the query object. It provides the coverage of the data set at the responding node (handheld). |
|  | hExpertise Input parameter. Handle to an expertise object. It specifies the data the responding node can provide from its local data store |
| Result | Returns 0, if successful. |
| Pre-conditions | The sync protocol handle should be valid and must have been earlier returned by the function call SyncProtocolInit. |
| Side Effects | None |
| Comments | This method is equivalent to the following algorithm: SyncProtocolAddStartMessage(hSyncProtocol, QUERY_RESPONSE) SyncProtocolAddUserContextElement(hSyncProtocol, hUserContext) SyncProtocolAddDatabaseIdentifierElement (hSyncProtocol, hDatabase) SyncProtocolAddVersionElement (hSyncProtocol, hVersion) ;Determine if query and expertise have common elements DO; There must be at least one Query/Expertise element SyncProtocolAddQueryElement(hSyncProtocol, hQueryElement, |

```
XXXXX_FLAG, NONE_FLAG)
WHILE (More Query/Expertise elements)
SyncProtocolAddEndElement (hSyncProtocol)
SyncProtocolAddEndMessage(hSyncProtocol)
```

SyncProtocolAddRequestUpdateMessage

| | | |
|---|---|---|
| Purpose | Adds "Request Update" message to the protocol object. Only the originating node calls this method. | |
| Prototype | ERR SyncProtocolAddRequestUpdateMessage (SYNC_PROTOCOL_HANDLE hSyncProtocol, USER_CONTEXT_HANDLE hUserContext, DATABASE_HANDLE hDatabase, VERSION_HANDLE hVersion, QUERY_HANDLE hQuery) | |
| Parameters | hSyncProtocol | Input parameter. Refers to the handle to sync protocol object |
| | hUserContext | Input parameter. Handle to an object that uniquely identifies the user context |
| | hDatabase | Input parameter. Handle to an object that uniquely identifies the database |
| | hVersion | Input parameter. Handle to sync protocol version object |
| | hQuery | Input parameter. Handle to the query object. It defines the data set, which the responding node (handheld) must return in its "Update Response" message. |
| Result | Returns 0, if successful. | |
| Pre-conditions | The sync protocol handle should be valid and must have been earlier returned by the function call SyncProtocolInit. | |
| Side Effects | None | |
| Comments | This method is equivalent to the following algorithm:<br>SyncProtocolAddStartMessage(hSyncProtocol, REQUEST_UPDATE)<br>SyncProtocolAddUserContextElement(hSyncProtocol, hUserContext)<br>SyncProtocolAddDatabaseIdentifierElement (hSyncProtocol, hDatabase)<br>SyncProtocolAddVersionElement(hSyncProtocol, hVersion)<br>WHILE (There are more Query elements)<br>SyncProtocolAddQueryElement(hSyncProtocol, hQueryElement, QUERY_FLAG, NONE_FLAG)<br>If (Number of Query elements is greater than 0)<br>SyncProtocolAddEndElement(hSyncProtocol)<br>SyncProtocolAddEndMessage(hSyncProtocol) | |

SyncProtocolAddUpdateResponseMessage

| | | |
|---|---|---|
| Purpose | Adds "Update Response" message to the protocol object. Only the responding node calls this method. | |
| Prototype | ERR SyncProtocolAddUpdateResponseMessage (SYNC_PROTOCOL_HANDLE hSyncProtocol, USER_CONTEXT_HANDLE hUserContext, DATABASE_HANDLE hDatabase, VERSION_HANDLE hVersion, UPDATE_HANDLE hUpdate, UPDATE_READ_CALLBACK fnReadCallback, VOID* pState, QUERY_HANDLE hPreQuestion, QUERY_HANDLE hPostQuestion) | |
| Parameters | hSyncProtocol | Input parameter. Refers to the handle to sync protocol object |
| | hUserContext | Input parameter. Handle to an object that uniquely identifies the user context |
| | hDatabase | Input parameter. Handle to an object that uniquely identifies the database |
| | hVersion | Input parameter. Handle to sync protocol version object |
| | hUpdate | Input parameter. Handle to the update object. It provides the data that has been requested by the originating node. |
| | fnReadCallback | Input parameter. The callback method provided by an application to read data from an offset in the Update element. This is used if any element in the Update object does not contain data. |
| | pState | Input parameter. This shall be passed as an argument to the update read callback method. |
| | hPreQuestion | Input parameter. Handle to the query object. It identifies the initial query. |
| | hPostQuestion | Input parameter. Handle to the query object. It identifies the answered query. |
| Result | Returns 0, if successful. | |
| Pre-conditions | The sync protocol handle should be valid and must have been earlier returned by the function call SyncProtocolInit. | |
| Side Effects | None | |
| Comments | This method is equivalent to the following algorithm:<br>SyncProtocolAddStartMessage(hSyncProtocol, UPDATE_RESPONSE)<br>SyncProtocolAddUserContextElement(hSyncProtocol, hUserContext)<br>SyncProtocolAddDatabaseIdentifierElement(hSyncProtocol, hDatabase)<br>SyncProtocolAddVersionElement(hSyncProtocol, hVersion)<br>WHILE (There are more Pre-question Query elements)<br>SyncProtocolAddQueryElement(hSyncProtocol, hQueryElement, QUERY_FLAG, PRE_QUESTION_FLAG)<br>If (Number of Pre-question Query elements was greater than 0)<br>SyncProtocolAddEndElement(hSyncProtocol)<br>WHILE (There are more Update elements)<br>SyncProtocolAddUpdateElement(hSyncProtocol, hDatabase, hUpdateElement, . . .)<br>If (Number of Update elements was greater than 0)<br>SyncProtocolAddEndElement(hSyncProtocol)<br>WHILE (There are more Post-question Query elements)<br>SyncProtocolAddEndElement(hSyncProtocol), hQueryElement, QUERY_FLAG, POST_QUESTION_FLAG)<br>If (Number of Post-question Query elements was greater than 0)<br>SyncProtocolAddEndElement(hSyncProtocol)<br>SyncProtocolAddEndMessage(hSyncProtocol) | |

SyncProtocolAddUpdateReportMessage

| | | |
|---|---|---|
| Purpose | Adds "Update Report" message to the protocol object. Only the originating node calls this method. | |
| Prototype | ERR SyncProtocolAddUpdateReportMessage (SYNC_PROTOCOL_HANDLE hSyncProtocol, USER_CONTEXT_HANDLE hUserContext, DATABASE_HANDLE hDatabase, VERSION_HANDLE hVersion, UPDATE_HANDLE hUpdate, UPDATEREAD_CALLBACK fnReadCallback, VOID* pState, QUERY_HANDLE hPreQuestion, QUERY_HANDLE hPostQuestion) | |
| Parameters | hSyncProtocol | Input parameter. Refers to the handle to sync protocol object |
| | hUserContext | Input parameter. Handle to an object that uniquely identifies the user context |
| | Database | Input parameter. Handle to an object that uniquely identifies the database |
| | hVersion | Input parameter. Handle to sync protocol version object |

-continued

| | | |
|---|---|---|
| | hUpdate | Input parameter. Handle to the update object. It provides the modifications at other sync nodes to be applied at the responding node. |
| | fnReadCallback | Input parameter. The callback method provided by an application to read data from an offset in the Update element. This is used if any element in the Update object does not contain data. |
| | pState | Input parameter. This shall be passed as an argument to the update read callback method. |
| | hPreQuestion | Input parameter. Handle to the query object. It identifies the initial query. |
| | hPostQueStion | Input parameter. Handle to the query object. It identifies the answered query. |
| Result | Returns 0, if successful. | |
| Pre-conditions | The sync protocol handle should be valid and must have been earlier returned by the function call SyncProtocolInit. | |
| Side Effects | None | |
| Comments | This method is equivalent to the following algorithm: SyncProtocolAddStartMessage(hSyncProtocol, UPDATE_REPORT) SyncProtocolAddUserContextElement(hSyncProtocol, hUserContext) SyncProtocolAddDatabaseIdentifierElement(hSyncProtocol, hDatabase) SyncProtocolAddVersion Element(hSyncProtocol, hVersion) WHILE (There are more Pre-question Query elements) SyncProtocolAddQueryElement(hSyncProtocol, hQueryElement, QUERY_FLAG, PRE_QUESTION_FLAG) If (Number of Pre-question Query elements was greater than 0) SyncProtocolAddEndElement(hSyncProtocol) WHILE (There are more Update elements) SyncProtocolAddUpdateElement(hSyncProtocol, hDatabase, hUpdateElement, If (Number of Update elements was greater than 0) SyncProtocolAddEndElement(hSyncProtocol) WHILE (There are more Post-question Query elements) SyncProtocolAddQueryElement(hSyncProtocol, hQueryElement, QUERY_FLAG, POST_QUESTION_FLAG) If (Number of Post-question Query elements was greater than 0) SyncProtocolAddEndElement(hSyncProtocol) SyncProtocolAddEndMessage(hSyncProtocol) | |

SyncProtocolAddUpdateAcknowledgeMessage

| | | |
|---|---|---|
| Purpose | Adds "Update Acknowledge" message to the protocol object. Only the responding node calls this method. | |
| Prototype | ERR SyncProtocolAddUpdateAcknowledgeMessage (SYNC_PROTOCOL_HANDLE hSyncProtocol, USER_CONTEXT_HANDLE hUserContext, DATABASE_HANDLE hDatabase, VERSION_HANDLE hVersion) | |
| Parameters | hSyncProtocol | Input parameter. Refers to the handle to sync protocol object |
| | hUserContext | Input parameter. Handle to an object that uniquely identifies the user context |
| | hDatabase | Input parameter. Handle to an object that uniquely identifies the database |
| | hVersion | Input parameter. Handle to sync protocol version object |
| Result | Returns 0, if successful. | |
| Pre-conditions | The sync protocol handle should be valid and must have been earlier returned by the function call SyncProtocolInit. | |
| Side Effects | None | |
| Comments | This method is equivalent to the following algorithm: SyncProtocolAddStartMessage(hSyncProtocol, UPDATE_ACKNOWLEDGE) SyncProtocolAddUserContextElement(hSyncProtocol, hUserContext) SyncProtocolAddDatabaseIdentifierElement(hSyncProtocol, hDatabase) SyncProtocolAddVersion Element(hSyncProtocol, hVersion) SyncProtocolAddEndMessage(hSyncProtocol) | |

SyncProtocolAddCancelSessionMessage

| | | |
|---|---|---|
| Purpose | Adds "Cancel Session" message to the protocol object. Both participating nodes can call this method. | |
| Prototype | ERR SyncProtocolAddCancelSessionMessage (SYNC_PROTOCOL_HANDLE hSyncProtocol, USER_CONTEXT_HANDLE hUserContext, VERSION_HANDLE hVersion, CANCEL_HANDLE hCancel) | |
| Parameters | hSyncProtocol | Input parameter. Refers to the handle to sync protocol object |
| | hUserContext | Input parameter. Handle to an object that uniquely identifies the user context |
| | hVersion | Input parameter. Handle to sync protocol version object |
| | hCancel | Input parameter. Handle to an object that provides details on why a cancel is being requested for the specified session. |
| Result | Returns 0, if successful. | |
| Pre-conditions | The sync protocol handle should be valid and must have been earlier returned by the function call SyncProtocolInit. | |
| Side Effects | None | |
| Comments | This method is equivalent to the following algorithm: SyncProtocolAddStartMessage(hSyncProtocol, CANCEL_SESSION) SyncProtocolAddUserContextElement(hSyncProtocol, hUserContext) SyncprotocolAddVersionElement(hSyncProtocol, hVersion) SyncProtocolAddCancelElement(hSyncProtocol, hCancel) SyncProtocolAddEndMessage(hSyncProtocol) | |

SyncProtocolAddCancelDatabaseSyncMessage

| | | |
|---|---|---|
| Purpose | Adds "Cancel Database Sync" message to the protocol object. Both participating nodes can call this method. | |
| Prototype | SyncProtocolAddCancelDataSyncMessage (SYNC_PROTOCOL_HANDLE hSyncProtocol, USER_CONTEXT_HANDLE hUserContext, DATABASE_HANDLE hDatabase, VERSION_HANDLE hVersion, CANCEL_HANDLE hCancel) | |
| Parameters | hSyncProtocol | Input parameter. Refers to the handle to sync protocol object |
| | hUserContext | Input parameter. Handle to an object that uniquely identifies the user context |
| | hDatabase | Input parameter. Handle to an object that uniquely identifies the database |
| | hVersion | Input parameter. Handle to sync protocol version object |
| | hCancel | Input parameter. Handle to an object that provides details on why a cancel is being requested for the specified database sync. |
| Result | Returns 0, if successful. | |
| Pre-conditions | The sync protocol handle should be valid and must have been earlier returned by the function call SyncProtocolInit. | |
| Side Effects | None | |
| Comments | This method is equivalent to the following algorithm: SyncProtocolAddStartMessage (hSyncProtocol, CANCEL_SESSION) | |

-continued

```
SyncProtocolAddUserContextElement
(hSyncProtocolUserContext)
SyncProtocolAddDatabaseIdentifierElement
(hSyncProtocol, hDatabase)
SyncProtocolAddVersionElement (hSyncProtocol,
hVersion)
SyncProtocolAddCancelElement (hSyncProtocol,
hCancel)
SyncProtocolAddEndMessage (hSyncProtocol)
```

Exemplary Writer Application Programming Interface

The reader interface to the synchronization protocol described herein provides a set of APIs to read a sync packet and return various sync messages and elements that are part of it. A reader method checks if the current element is complete in the available data, and if not it calls a transport API to read more blocks of data until the element is completely read. The following methods comprise the reader interface of sync protocol API. It is appreciated that other API methods can be defined and added to those described herein.

SyncProtocolGetNextMessage

| | |
|---|---|
| Purpose | Determines the next message in the sync packet. |
| Prototype | ERR SyncProtocolGetNextMessage (SYNC_PROTOCOL_HANDLE hSyncProtocol, MESSAGE_HANDLE* phMessage) |
| Parameters | hSyncProtocol — Input parameter. Refers to the handle to sync protocol object |
| | phMessage — Output parameter. Reference to the next message in the sync packet is returned in this parameter. If there are no more messages left in the sync packet, NULL is assigned to it and no error is returned. |
| Result | Returns 0, if successful. |
| Pre-conditions | The sync protocol handle should be valid and must have been earlier returned by the function call SyncProtocolInit. |
| Side Effects | None |
| Comments | If the read buffer associated with sync protocol object has no data, this method calls a transport API to read data. If the protocol is in the middle of parsing the current message, it skips to the next message. It may have to read multiple blocks using the transport API before it determines the next message. |

SyncProtocolGetMessageType

| | |
|---|---|
| Purpose | Determines the message type for the specified message. |
| Prototype | ERR SyncProtocolGetMessageType (SYNC_PROTOCOL_HANDLE hSyncProtocol, MESSAGE_HANDLE hMessage, MESSAGE_TYPE* pMesgType) |
| Parameters | hSyncProtocol — Input parameter. Refers to the handle to sync protocol object |
| | hMessage — Input parameter. Handle to the current message in the sync packet. |
| | pMesgType — Output parameter to store the message type. |
| Result | Returns 0, if successful. |
| Pre-conditions | The sync protocol handle should be valid and must have been earlier returned by the function call SyncProtocolInit. |
| Side Effects | None |
| Comments | None |

SyncProtocolGetNextElement

| | |
|---|---|
| Purpose | Determines the next element in the current sync message. |
| Prototype | ERR SyncProtocolGetNextElement (SYNC_PROTOCOL_HANDLE hSyncProtocol, MESSAGE_HANDLE hMessage, ELEMENT_HANDLE phElement) |
| Parameters | hSyncProtocol — Input parameter. Refers to the handle to sync protocol object |
| | hMessage — Input parameter. Handle to the current message in the sync packet. |
| | phElement — Output parameter. Reference to the next element in the current message is returned in this parameter. If there are no more elements left in the current sync message, NULL is assigned to it and no error is returned. |
| Result | Returns 0, if successful. |
| Pre-conditions | The sync protocol handle should be valid and must have been earlier returned by the function call SyncProtocolInit. |
| Side Effects | None |
| Comments | If the read buffer associated with sync protocol object has no data left to parse, this method calls a transport API to read data. If the protocol is in the middle of parsing the current element, it skips to the next element. It may have to read multiple blocks using the transport API before it determines the next element. |

SyncProtocolGetElementType

| | |
|---|---|
| Purpose | Determines the element type for the specified element. |
| Prototype | ERR SyncProtocolGetElementType (SYNC_PROTOCOL_HANDLE hSyncProtocol, ELEMENT_HANDLE hElement, ELEMENT_TYPE* pElemType) |
| Parameters | hSyncProtocol — Input parameter. Refers to the handle to sync protocol object |
| | hElement — Input parameter. Handle to the current element in the message. |
| | pElemType — Output parameter to store the element type. |
| Result | Returns 0, if successful. |
| Pre-conditions | The sync protocol handle should be valid and must have been earlier returned by the function call SyncProtocolInit. |
| Side Effects | None |
| Comments | Based on the element type, appropriate Sync Protocol Reader API should be called to parse it. |

SyncProtocolGetUserContextElement

| | |
|---|---|
| Purpose | Determines the user context for this message from the current element in the sync packet, create a user context object and returns the handle to it in the output parameter. |
| Prototype | ERR SyncProtocolGetUserContextElement (SYNC_PROTOCOL_HANDLE hSyncProtocol, ELEMENT_HANDLE hElement, USER_CONTEXT_HANDLE phUserContext) |
| Parameters | hSyncProtocol — Input parameter. Refers to the handle to sync protocol object |
| | hElement — Input parameter. Handle to the current element in the message. |
| | phUserContext — Output parameter. Pointer to the handle to user context object. |
| Result | Returns 0, if successful. |
| Pre-conditions | The sync protocol handle should be valid and must have been earlier returned by the function call SyncProtocolInit. |
| Side Effects | None |
| Comments | None |

SyncProtocolGetSessionIDElement

| | |
|---|---|
| Purpose | Determines the session information for this message from the current element in the sync packet, create a session id object and return the handle to it in the output parameter. |
| Prototype | ERR SyncProtocolGetSessionIDElement (SYNC_PROTOCOL_HANDLE hSyncProtocol, ELEMENT_HANDLE hElement, SESSIONID_HANDLE phSession) |
| Parameters | hSyncProtocol    Input parameter. Refers to the handle to sync protocol object |
| | hElement    Input parameter. Handle to the current element in the message. |
| | phSession    Output parameter. Pointer to the handle to session id object. |
| Result | Returns 0, if successful. |
| Pre-conditions | The sync protocol handle should be valid and must have been earlier returned by the function call SyncProtocolInit. |
| Side Effects | None |
| Comments | None |

SyncProtocolGetDatabaseIdentifierElement

| | |
|---|---|
| Purpose | Determines the database information for this message from the current element in the sync packet, create a database object and return the handle to it in the output parameter. |
| Prototype | ERR SyncProtocolGetDatabaseIdentifierElement (SYNC_PROTOCOL_HANDLE hSyncProtocol, ELEMENT_HANDLE hElement, DATABASE_HANDLE* phDatabase) |
| Parameters | hSyncProtocol    Input parameter. Refers to the handle to sync protocol object |
| | hElement    Input parameter. Handle to the current element in the message. |
| | phDatabase    Output parameter. Pointer to the handle to database object. |
| Result | Returns 0, if successful. |
| Pre-conditions | The sync protocol handle should be valid and must have been earlier returned by the function call SyncProtocolInit. |
| Side Effects | None |
| Comments | None |

SyncProtocolGetVersionElement

| | |
|---|---|
| Purpose | Determines the version information for this message from the current element in the sync packet, create a version object and return the handle to it in the output parameter. |
| Prototype | ERR SyncProtocolGetVersionElement (SYNC_PROTOCOL_HANDLE hSyncProtocol, ELEMENT_HANDLE hElement, VERSION_HANDLE* phVersion) |
| Parameters | hSyncProtocol    Input parameter. Refers to the handle to sync protocol object |
| | hElement    Input parameter. Handle to the current element in the message. |
| | phVersion    Output parameter. Pointer to the handle to version object. |
| Result | Returns 0, if successful. |
| Pre-conditions | The sync protocol handle should be valid and must have been earlier returned by the function call SyncProtocolInit. |
| Side Effects | None |
| Comments | None |

SyncProtocolGetQueryElement

| | |
|---|---|
| Purpose | Reads the query from the current element in the sync packet, create a query element object and return the handle to it in the output parameter. It also determines various flag values associated with the query element. |
| Prototype | ERR SyncProtocolGetQueryElement (SYNC_PROTOCOL_HANDLE hSyncProtocol, ELEMENT_HANDLE hElement, QUERY_ELEMENT_HANDLE* phQuery, QUERY_EXPERTISE_FLAG* pfQueryExpertise, QUERY_TYPE_FLAG* pfQueryType) |
| Parameters | hSyncProtocol    Input parameter. Refers to the handle to sync protocol object |
| | hElement    Input parameter. Handle to the current element in the message. |
| | phQuery    Output parameter. Pointer to the handle to query element object. |
| | pfQueryExpertise    Output parameter. Whether query element is part of query object or expertise. |
| | pfQueryType    Output parameter. Whether query element is part of pre-question or post-question. |
| Result | Returns 0, if successful. |
| Pre-conditions | The sync protocol handle should be valid and must have been earlier returned by the function call SyncProtocolInit. |
| Side Effects | None |
| Comments | None |

SyncProtocolGetUpdateElement

| | |
|---|---|
| Purpose | Reads the update from this element in the sync packet, create an update element object and return the handle to it in the output parameter. |
| Prototype | ERR SyncProtocolGetUpdateElement (SYNC_PROTOCOL_HANDLE hSyncProtocol, ELEMENT_HANDLE hElement, DATABASE_HANDLE hDatabase, UPDATE_ELEMENT_HANDLE* phUpdate, UPDATE_WRITE_CALLBACK fnWriteCallback, VOID* pState) |

|             |                |                                                                                                                                                                                                                                                 |
|-------------|----------------|-------------------------------------------------------------------------------------------------------------------------------------------------------------------------------------------------------------------------------------------------|
| Parameters  | hSyncProtocol  | Input parameter. Refers to the handle to sync protocol object                                                                                                                                                                                   |
|             | hElement       | Input parameter. Handle to the current element in the message.                                                                                                                                                                                  |
|             | hDatabase      | Input parameter. Handle to the database object obtained earlier from this sync message.                                                                                                                                                         |
|             | phUpdate       | Output parameter. Pointer to the handle to an update element object.                                                                                                                                                                            |
|             | fnWriteCallback| Input parameter. The callback method provided by an application to allow writing of data at an offset for the update element in its local data store as the data becomes available on the transport channel.                                   |
|             | pState         | Input parameter. This shall be passed as an argument to the update write callback method.                                                                                                                                                       |
| Result      | Returns 0, if successful. |                                                                                                                                                                                                                                      |
| Pre-conditions | The sync protocol handle should be valid and must have been earlier returned by the function call SyncProtocolInit. |                                                                                                                                                          |
| Side Effects| None           |                                                                                                                                                                                                                                                 |
| Comments    | An Update element may have a large amount of data and might require multiple read calls on the transport to gather all of it. If UPDATE_WRITE_CALLBACK is NULL, this method will read the complete data for the update element from the transport before returning a handle to it. If the calling function has specified the callback method, it would be called to provide the data in chunks as it becomes available on the transport. In either case, the function returns when the complete data for the update element has been made available to the calling function. The signature of the UPDATE_WRITE_CALLBACK would look like: ERR WriteUpdateElement (DATABASE_HANDLE hDatabase, UPDATE_ELEMENT_HANDLE hUpdate, DWORD dwWriteOffset, UCHAR* pBuffer, DWORD dwBytesWrite, VOID* pState) |

SyncProtocolGetCancelElement

| | | |
|---|---|---|
| Purpose | Reads the cancel information for this message from the current element in the sync packet, create a cancel object and return the handle to it in the output parameter. | |
| Prototype | ERR SyncProtocolGetCancelElement (SYNC_PROTOCOL_HANDLE hSyncProtocol, ELEMENT_HANDLE hElement, CANCEL_HANDLE* phCancel) | |
| Parameters | hSyncProtocol | Input parameter. Refers to the handle to sync protocol object |
|  | hElement | Input parameter. Handle to the current element in the message. |
|  | phCancel | Output parameter. Pointer to the handle to cancel object. |
| Result | Returns 0, if successful. | |
| Pre-conditions | The sync protocol handle should be valid and must have been earlier returned by the function call SyncProtocolInit. | |
| Side Effects | None | |
| Comments | None | |

SyncProtocolGetGenericElement

| | | |
|---|---|---|
| Purpose | Reads the user/third party defined element from the sync packet, create an update element object and return the handle to it in the output parameter. | |
| Prototype | ERR SyncProtocolGetGenericElement (SYNC_PROTOCOL_HANDLE hSyncProtocol, ELEMENT_HANDLE hElement, DATABASE_HANDLE hDatabase, GENERIC_ELEMENT_HANDLE* phGeneric, GENERIC_WRITE_CALLBACK fnWriteCallback, VOID* pState) | |
| Parameters | hSyncProtocol | Input parameter. Refers to the handle to sync protocol object |
|  | hElement | Input parameter. Handle to the current element in the message. |
|  | hDatabase | Input parameter. Handle to the database object obtained earlier from this sync message. |
|  | phGeneric | Output parameter. Pointer to the handle to the user-defined element object. |
|  | fnWriteCallback | Input parameter. The callback method provided by an application to allow writing of data at an offset for the generic element in its local data store as the data becomes available on the transport channel. |
|  | pState | Input parameter. This shall be passed as an argument to the update write callback method. |
| Result | Returns 0, if successful. | |
| Pre-conditions | The sync protocol handle should be valid and must have been earlier returned by the function call SyncProtocolInit. | |
| Side Effects | None | |
| Comments | The write callback method allows writing a specified number of bytes from a given offset in the element. The callback method cannot be NULL. The signature of GENERIC_WRITE_CALLBACK method for Generic element | |

-continued should be:
ERR
WriteGenericElement (DATABASE_HANDLE hDatabase,
GENERIC_ELEMENT_HANDLE* phGeneric, DWORD dwWriteOffset, UCHAR*
pBuffer, DWORD dwBytesWrite, VOID* pState)
This method is implemented by the third party component that defines the
element. The first parameter is an in/out parameter. In the first
WriteGenericElement call, pointer to NULL handle should be passed. This
method shall create a Generic element and return a handle to it that is passed in
subsequent calls.

SyncProtocolGetRequestQueryMessage

| | | |
|---|---|---|
| Purpose | This method is called if the message type is "Request Query". It reads the current sync message and populates user context, database identifier, version information and query object and returns handles to these in the output parameters. | |
| Prototype | ERR SyncProtocolGetRequestQueryMessage (SYNC_PROTOCOL_HANDLE hSyncProtocol, MESSAGE_HANDLE hMessage, USER_CONTEXT_HANDLE* phUserContext, DATABASE_HANDLE* phDatabase, VERSION_HANDLE* phVersion, QUERY_HANDLE* phQuery) | |
| Parameters | hSyncProtocol | Input parameter. Refers to the handle to sync protocol object |
| | hMessage | Input parameter. Handle to the current message in the sync packet. |
| | phUserContext | Output parameter. Pointer to handle to an object that uniquely identifies the user context |
| | phDatabase | Output parameter. Pointer to handle to an object that uniquely identifies the database |
| | phVersion | Output parameter. Pointer to handle to sync protocol version object |
| | phQuery | Output parameter. Pointer to handle to the query object. It provides the rule to define or restrict the data set. |
| Result | Returns 0, if successful. | |
| Pre-conditions | The sync protocol handle should be valid and must have been earlier returned by the function call SyncProtocolInit. | |
| Side Effects | None | |
| Comments | The calling method is responsible for releasing these objects. It ignores all other elements that might have been packaged in this message | |

SyncProtocolGetQueryResponseMessage

| | | |
|---|---|---|
| Purpose | This method is called if the message type is "Query Response". It reads the current sync message and populates user context, database identifier, version information, query and expertise objects and returns handle to these in the output parameters. | |
| Prototype | ERR SyncProtocolGetQueryResponseMessage (SYNC_PROTOCOL_HANDLE hSyncProtocol, MESSAGE_HANDLE hMessage, USER_CONTEXT_HANDLE* phUserContext, DATABASE_HANDLE* phDatabase, VERSION_HANDLE* phVersion, QUERY_HANDLE* phQuery, QUERY_HANDLE* phExpertise) | |
| Parameters | hSyncProtocol | Input parameter. Refers to the handle to sync protocol object |
| | hMessage | Input parameter. Handle to the current message in the sync packet. |
| | phUserContext | Output parameter. Pointer to handle to an object that uniquely identifies the user context |
| | phDatabase | Output parameter. Pointer to handle to an object that uniquely identifies the database |
| | phVersion | Output parameter. Pointer to handle to sync protocol version object |
| | phQuery | Output parameter. Pointer to handle to the query object. |
| | phExpertise | Output parameter. Pointer to handle to the expertise object. |
| Result | Returns 0, if successful. | |
| Pre-conditions | The sync protocol handle should be valid and must have been earlier returned by the function call SyncProtocolInit. | |
| Side Effects | None | |
| Comments | The calling method is responsible for releasing these objects. It ignores all other elements that might have been packaged in this message | |

SyncProtocolGetRequestUpdateMessage

| | | |
|---|---|---|
| Purpose | This method is called if the message type is "Request Update". It reads the current sync message and populates user context, database identifier, version information and query object and returns handles to these in the output parameters. | |
| Prototype | ERR SyncProtocolGetRequestUpdateMessage (SYNC_PROTOCOL_HANDLE hSyncProtocol, MESSAGE_HANDLE hMessage, USER_CONTEXT_HANDLE* phUserContext, DATABASE_HANDLE* phDatabase, VERSION_HANDLE* phVersion, QUERY_HANDLE* phQuery) | |
| Parameters | hSyncProtocol | Input parameter. Refers to the handle to sync protocol object |
| | hMessage | Input parameter. Handle to the current message in the sync packet. |
| | phUserContext | Output parameter. Pointer to handle to an object that uniquely identifies the user context |
| | phDatabase | Output parameter. Pointer to handle to an object that uniquely identifies the database |
| | phVersion | Output parameter. Pointer to handle to sync protocol version object |
| | phQuery | Output parameter. Pointer to handle to the query object. |
| Result | Returns 0, if successful. | |
| Pre-conditions | The sync protocol handle should be valid and must have been earlier returned by the function call SyncProtocolInit. | |
| Side Effects | None | |
| Comments | The calling method is responsible for releasing these objects. It ignores all other elements that might have been packaged in this message | |

SyncProtocolGetUpdateResponseMessage

| | | |
|---|---|---|
| Purpose | This method is called if the message type is "Update Response". It reads the current sync message and populates user context, database identifier, version information, update object, pre-question and post-question query objects and returns handle to these in the output parameters. | |
| Prototype | ERR SyncProtocolGetUpdateResponseMessage (SYNC_PROTOCOL_HANDLE hSyncProtocol, MESSAGE_HANDLE hMessage, USER_CONTEXT_HANDLE* phUserContext, DATABASE_HANDLE* phDatabase, VERSION_HANDLE* phVersion, UPDATE_HANDLE* phUpdate, UPDATE_WRITE_CALLBACK fnWriteCallback, VOID* pState, QUERY_HANDLE* phPreQuestion, QUERY_HANDLE* phPostQuestion) | |
| Parameters | hSyncProtocol | Input parameter. Refers to the handle to sync protocol object |
| | hMessage | Input parameter. Handle to the current message in the sync packet. |
| | phUserContext | Output parameter. Pointer to handle to an object that uniquely identifies the user context |
| | phDatabase | Output parameter. Pointer to handle to an object that uniquely identifies the database |
| | phVersion | Output parameter. Pointer to handle to sync protocol version object |
| | phUpdate | Output parameter. Pointer to handle to the update object. |
| | fnWriteCallback | Input parameter. The callback method provided by an application to allow writing of data at an offset for the update element in its local data store as the data becomes available on the transport channel. |
| | pState | Input parameter. This shall be passed as an argument to the update write callback method. |
| | phPreQuestion | Output parameter. Pointer to handle to the pre-question query object. |
| | phPostQuestion | Output parameter. Pointer to handle to the post-question query object. |
| Result | Returns 0, if successful. | |
| Pre-conditions | The sync protocol handle should be valid and must have been earlier returned by the function call SyncProtocolInit. | |
| Side Effects | None | |
| Comments | The calling method is responsible for releasing these objects. It ignores all other elements that might have been packaged in this message | |

SyncProtocolGetUpdateReportMessage

| | |
|---|---|
| Purpose | This method is called if the message type is "Update Report". It reads the current sync message and populates user context, database identifier, version information, update object, pre-question and post-question query objects and returns handle to these in the output parameters. |
| Prototype | ERR SyncProtocolGetUpdateReportMessage (SYNC_PROTOCOL_HANDLE hSyncProtocol, MESSAGE_HANDLE hMessage, USER_CONTEXT_HANDLE* phUserContext, DATABASE_HANDLE* phDatabase, VERSION_HANDLE* phVersion, UPDATE_HANDLE* phUpdate, UPDATE_WRITE_CALLBACK fnWriteCallback, VOID* pState, QUERY_HANDLE* phPreQuestion, QUERY_HANDLE* phPostQuestion) |
| Parameters | hSyncProtocol — Input parameter. Refers to the handle to sync protocol object |
| | hMessage — Input parameter. Handle to the current message in the sync packet. |
| | phUserContext — Output parameter. Pointer to handle to an object that uniquely identifies the user context |
| | phDatabase — Output parameter. Pointer to handle to an object that uniquely identifies the database |
| | phVersion — Output parameter. Pointer to handle to sync protocol version object |
| | phUpdate — Output parameter. Pointer to handle to the update object. |
| | fnWriteCallback — Input parameter. The callback method provided by an application to allow writing of data at an offset for the update element in its local data store as the data becomes available on the transport channel. |
| | pState — Input parameter. This shall be passed as an argument to the update write callback method. |
| | phPreQuestion — Output parameter. Pointer to handle to the pre-question query object. |
| | phPostQuestion — Output parameter. Pointer to handle to the post-question query object. |
| Result | Returns 0, if successful. |
| Pre-conditions | The sync protocol handle should be valid and must have been earlier returned by the function call SyncProtocolInit. |
| Side Effects | None |
| Comments | The calling method is responsible for releasing these objects. It ignores all other elements that might have been packaged in this message |

35

SyncProtocolGetUpdateAcknowledgeMessage

| | |
|---|---|
| Purpose | This method is called if the message type is "Update Acknowledge". It reads the current sync message and populates user context, database identifier and version information and returns handles to these in the output parameters. |
| Prototype | ERR SyncProtocolGetUpdateAcknowledgeMessage (SYNC_PROTOCOL_HANDLE hSyncProtocol, MESSAGE_HANDLE hMessage, USER_CONTEXT_HANDLE* phUserContext, DATABASE_HANDLE* phDatabase, VERSION_HANDLE* phVersion) |
| Parameters | hSyncProtocol — Input parameter. Refers to the handle to sync protocol object |
| | hMessage — Input parameter. Handle to the current message in the sync packet. |
| | phUserContext — Output parameter. Pointer to handle to an object that uniquely identifies the user context |
| | phDatabase — Output parameter. Pointer to handle to an object that uniquely identifies the database |
| | phVersion — Output parameter. Pointer to handle to sync protocol version object |
| Result | Returns 0, if successful. |
| Pre-conditions | The sync protocol handle should be valid and must have been earlier returned by the function call SyncProtocolInit. |
| Side Effects | None |
| Comments | The calling method is responsible for releasing these objects. It ignores all other elements that might have been packaged in this message |

SyncProtocolGetCancelSessionMessage

| | |
|---|---|
| Purpose | This method is called if the message type is "Cancel Session". It reads the current sync message and populates user context, version information and cancel object and returns handles to these in the output parameters. |
| Prototype | ERR SyncProtocolGetCancelSessionMessage (SYNC_PROTOCOL_HANDLE hSyncProtocol, MESSAGE_HANDLE hMessage, USER_CONTEXT_HANDLE* phUserContext, VERSION_HANDLE* phVersion, CANCEL_HANDLE* phCancel) |
| Parameters | hSyncProtocol    Input parameter. Refers to the handle to sync protocol object<br>hMessage    Input parameter. Handle to the current message in the sync packet.<br>phUserContext    Output parameter. Pointer to handle to an object that uniquely identifies the user context<br>phVersion    Output parameter. Pointer to handle to sync protocol version object<br>phCancel    Output parameter. Pointer to handle to the cancel object. |
| Result | Returns 0, if successful. |
| Pre-conditions | The sync protocol handle should be valid and must have been earlier returned by the function call SyncProtocolInit. |
| Side Effects | None |
| Comments | The calling method is responsible for releasing these objects. It ignores all other elements that might have been packaged in this message |

SyncProtocolGetCancelDatabaseSyncMessage

| | |
|---|---|
| Purpose | This method is called if the message type is "Cancel Database Sync". It reads the current sync message and populates user context, database identifier, version information and cancel object and returns handles to these in the output parameters. |
| Prototype | ERR SyncProtocolGetCancelDatabaseSyncMessage (SYNC_PROTOCOL_HANDLE hSyncProtocol, MESSAGE_HANDLE hMessage, USER_CONTEXT_HANDLE* phUserContext, DATABASE_HANDLE* phDatabase, VERSION_HANDLE* ph Version, CANCEL_HANDLE* phCancel) |
| Parameters | hSyncProtocol    Input parameter. Refers to the handle to sync protocol object<br>hMessage    Input parameter. Handle to the current message in the sync packet.<br>phUserContext    Output parameter. Pointer to handle to an object that uniquely identifies the user context<br>phDatabase    Output parameter. Pointer to handle to an object that uniquely identifies the database<br>phVersion    Output parameter. Pointer to handle to sync protocol version object<br>phCancel    Output parameter. Pointer to handle to the cancel object. |
| Result | Returns 0, if successful. |
| Pre-conditions | The sync protocol handle should be valid and must have been earlier returned by the function call SyncProtocolInit. |
| Side Effects | None |
| Comments | The calling method is responsible for releasing these objects. It ignores all other elements that might have been packaged in this message |

The preferred embodiments of the present invention, a synchronization protocol for synchronizing data between nodes, are thus described. While the present invention has been described in particular embodiments, it should be appreciated that the present invention should not be construed as limited by such embodiments, but rather construed according to the below claims.

What is claimed is:

1. A method of synchronizing a data set between electronic devices comprising a first version of a data set residing on a first node and either the same, older or an updated version of the same data set residing on at least one other node, said method comprising the steps of:

exchanging sync packets between a first node and at least one other node, wherein a sync packet comprises one or more messages and wherein a message comprises a plurality of elements, wherein at least one of said elements identifies a data set for a synchronization session and a synchronization protocol version implemented at the respective nodes wherein messages and elements of differing synchronization protocols are ignored by the respective node, and wherein said sync packets include messages identifying first query information inquiring what changes outside of a first coverage of one version of said data set on said first node are available, at least one other query information inquiring what changes outside of at least one other coverage of the one version of said data set on said at least one other node are available, and at least one other expertise information providing which changes are available within said at least one other coverage;

using information in said sync packets to identify any needed data from said first node that needs to be sent to said at least one other node and any needed data from said at least one other node that needs to be sent to said first node to synchronize said data set; and exchanging identified needed data to synchronize said data set between said first and at least one other nodes, wherein said identified data is streamed in blocks of data and wherein said blocks have a size corresponding to a size of an outbound buffer.

2. The method of claim 1, further comprising the step of: compressing said identified needed data before said identified needed data is streamed between said nodes.

3. The method of claim 1 wherein a sync packet further comprises a first element type identifying a beginning of said sync packet and a second element type identifying an end of said sync packet, wherein in said sync packet, one or more messages reside between said first element and said second element.

4. The method of claim 3 wherein a message comprises a first element type identifying a beginning of said message and a second element type identifying an end of said message, wherein other elements reside between said first element and said second element.

5. The method of claim 1 wherein said sync packets comprise a first sync packet comprising a first message and a second sync packet comprising a second message, wherein said second sync packet is sent subsequent to sending said first sync packet and wherein said second sync packet is sent before a response to said first sync packet is received.

6. The method of claim 1 further comprising: receiving an identifier referring to a channel that is open to said first node and said at least one other node, said channel for sending and receiving sync packets.

7. The method of claim 1 wherein a sync packet also comprises information identifying a session.

8. The method of claim 1, wherein the data from said first node that needs to be sent to said at least one other node is determined in accordance with changes in one version of said data set since a previous synchronization between said first node and said at least one other node.

9. The method of claim 1, wherein the data from said at least one other node that needs to be sent to said first node is determined in accordance with a coverage of one version of said data set.

10. The method of claim 1, wherein said first coverage is determined in accordance with a first set of synchronization clocks, and said at least one other coverage is determined in accordance with at least one other set of synchronization clocks.

11. The method of claim 1, wherein the data from said first node that needs to be sent to said at least another node is determined in accordance with said at least one other coverage.

12. The method of claim 1, wherein the data from said at least one other node that needs to be sent to said first node is determined in accordance with said at least one other expertise information.

13. A method of synchronizing, using a synchronization protocol, in association with: a bus; a processor coupled to said bus; and memory coupled to said bus, said memory storing instructions for implementing the method of synchronizing a data set comprising a version of a first data set residing in said memory and either the same, older or an updated version of the same data set residing on a computer system, said method comprising the steps of:

exchanging sync packets between said memory and said computer system, wherein a sync packet comprises one or more messages and wherein a message comprises a plurality of elements, wherein at least one of said elements identifies a data set for a synchronization session and a synchronization protocol version implemented at said memory and said computer system and wherein information in said packets is used by said processor to identify any data from said memory that needs to be sent to said computer system and any data from said computer system that needs to be sent to said memory to synchronize said data set, wherein said sync packets include messages identifying first query information inquiring what changes outside of a first coverage of one version of said data set on said first node are available, second query information inquiring what changes outside of a second coverage of the one version of said data set on said at least one other node are available, and second expertise information providing which changes are available within said second coverage; and exchanging identified data needed to synchronize said data set between said memory and said computer systems wherein said identified data is streamed in blocks of data and wherein said blocks have a size corresponding to a size of an outbound buffer.

14. The method of claim 13 wherein said method further comprises: compressing said identified data before said data is streamed between said memory and said computer system.

15. The method of claim 13 wherein a sync packet comprises a first element identifying a beginning of said packet and a second element identifying an end of said packet, wherein said one or more messages reside between said first element and said second element.

16. The method of claim 15 wherein a message comprises a first element identifying a beginning of said message and a second element identifying an end of said message, wherein other elements reside between said first element and said second element.

17. The method of claim 13 wherein said sync packets comprise a first sync packet comprising a first message and a second sync packet comprising a second message, wherein said second sync packet is sent subsequent to sending said first sync packet and wherein said second sync packet is sent before a response to said first sync packet is received.

18. The method of claim 13 further comprising: receiving an identifier referring to a channel that is open to said memory and said computer system, said channel for sending and receiving sync packets.

19. The method of claim 13 wherein said sync packet also comprises information identifying a session.

20. The method of claim 13, wherein the data from said memory that needs to be sent to said computer system is determined in accordance with changes in said first version of said data set since a synchronization between said memory and said computer systems.

21. The method of claim 13, wherein the data from said computer system that needs to be sent to said memory is determined in accordance with a coverage of said first version of said data set.

22. The method of claim 13, wherein said first coverage is determined in accordance with a first set of synchronization clocks, and said second coverage is determined in accordance with a second set of synchronization clocks.

23. The method of claim 13, wherein the data from said memory that needs to be sent to said computer system is determined in accordance with said second coverage.

24. The method of claim 13, wherein the data from said computer system that needs to be sent to said memory is determined in accordance with said second expertise information.

25. A storage medium having computer-readable code stored thereon for causing a device to perform a method of synchronizing a data set comprising a first version of a data set residing on a first node and either, the same, an older or an updated version of the same data set residing on at least one other node, said method comprising:

exchanging sync packets between said first and said at least one other nodes, wherein a sync packet comprises one or more messages and wherein a message comprises a plurality of elements, wherein at least one of said elements identifies a data set for a synchronization session and a synchronization protocol version implemented at said respective nodes and wherein information in said packets is used to identify any data from said first node that needs to be sent to said at least one other node and any data from said at least one other node that needs to be sent to said first node to synchronize said data set wherein said sync packets include messages identifying first query information inquiring what changes outside of a first coverage of one version of said data set on said first node are available, at least one other query information inquiring what changes outside of at least one other coverage of the one version of said data set on said at least one other node are available, and at least one other expertise information providing which changes are available within said at least one other coverage;

and exchanging identified data needed to synchronize said data set between said first and at least one other nodes;

wherein said identified data is streamed in blocks of data and wherein said blocks have a size corresponding to a size of an outbound buffer.

26. The storage medium of claim 25 wherein said computer-readable program code embodied therein causes said device to perform said method comprising: compressing said identified data before said identified data is streamed between said nodes.

27. The storage medium of claim 25 wherein said sync packet comprises a first element identifying a beginning of said sync packet and a second element identifying an end of said sync packet, wherein said one or more messages reside between said first element and said second element.

28. The storage medium of claim 27 wherein a message comprises a first element identifying a beginning of said message and a second element identifying an end of said message, wherein other elements reside between said first element and said second element.

29. The storage medium of claim 25 wherein sync packets comprise a first sync packet comprising a first message and a second sync packet comprising a second message, wherein said second sync packet is sent subsequent to sending said first sync packet and wherein said second sync packet is sent before a response to said first sync packet is received.

30. The storage medium of claim 25 wherein said computer-readable code embodied therein causes said device to perform said method comprising the steps of: receiving an identifier referring to a channel that is open to said first node and said at least one other node, said channel for sending and receiving sync packets.

31. The storage medium of claim 25 wherein said sync packets also comprises information identifying a session.

32. The storage medium of claim 25, wherein the data from said first node that needs to be sent to said at least one other node is determined in accordance with changes in said first version of said data set.

33. The storage medium of claim 25, wherein the data from said at least one other node that needs to be sent to said first node is determined in accordance with a coverage of said first version of said data set.

34. The storage medium of claim 25, wherein said first coverage is determined in accordance with a first set of synchronization clocks, and said at least one other coverage is determined in accordance with at least one other set of synchronization clocks.

35. The storage medium of claim 25, wherein the data from said first node that needs to be sent to said at least one other node is determined in accordance with said at least one other coverage.

36. The storage medium of claim 25, wherein the data from said at least one other node that needs to be sent to said first node is determined in accordance with said at least one other expertise information.

* * * * *